United States Patent [19]

Cook

[11] 3,980,809
[45] Sept. 14, 1976

[54] ENCODING LOGIC FOR REDUCED BANDWIDTH PICTORIAL DATA TRANSMISSION SYSTEM

[75] Inventor: William Christopher Cook, Rockville, Md.

[73] Assignee: International Business Machines Corporation, Armonk, N.Y.

[22] Filed: Mar. 6, 1975

[21] Appl. No.: 555,756

Related U.S. Application Data

[63] Continuation-in-part of Ser. No. 379,523, July 16, 1973, abandoned.

[52] U.S. Cl............................. 178/6; 178/DIG. 3; 340/347 DD
[51] Int. Cl.².......................................... H04N 7/12
[58] Field of Search ............... 178/5, 6, 6.8, DIG. 3; 340/347 DD

[56] References Cited
UNITED STATES PATENTS

| | | |
|---|---|---|
| 540,772 | 6/1885 | Willoughby............................ 178/5 |
| 3,743,765 | 7/1973 | Maier................................... 178/6.8 |
| 3,813,485 | 5/1974 | Arps .................................. 178/DIG. 3 |
| 3,833,900 | 9/1974 | Bahl............................. 340/347 DD |
| 3,849,592 | 11/1974 | Rosenheck............................. 178/6 |

Primary Examiner—Howard W. Britton
Attorney, Agent, or Firm—John E. Hoel

[57] ABSTRACT

The present invention relates to pictorial data transmission systems for transmitting fixed images from one point to another. The invention employs two modes for encoding successive blocks of elements (typically four elements by four elements). If a data block contains black elements, the system sequentially compares a series of a selected vocabulary of simple geometric patterns in a pattern library, with the pattern of black elements in the data block. The library of reference patterns are compared in the order of most black to least black. The bit compare logic of the subject invention determines when all the elements of a first reference pattern compare with elements present in the data block. The bit compare logic then indicates whether any bit locations in the data block are leftover after the comparison with the first reference pattern. Leftover elements are matched with a second reference pattern which in turn is encoded and transmitted on an output line. The matching process will continue until the data block has been completely encoded as a composite of reference patterns. All reference patterns matched are encoded and sequentially transmitted on an output line for transmission, storage or display. The second mode of operation for the subject invention is to employ run length of encoding of successive white spaces.

4 Claims, 19 Drawing Figures

PICTORIAL DATA TRANSMISSION SYSTEM

SUBDIVISION OF DIGITAL TV PICTURE INTO DATA BLOCKS

FIG. 3a
SIMPLE GEOMETRIC REFERENCE PATTERNS
α = PATTERN INDEX NUMBER
α = 0 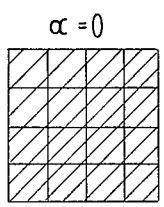
α = 1 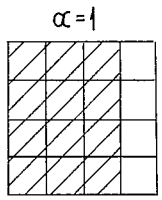
α = 2 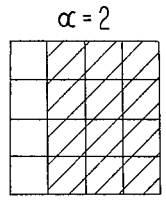
α = 3 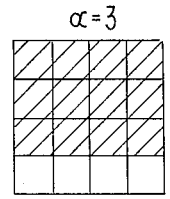
α = 4 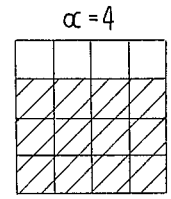
α = 5 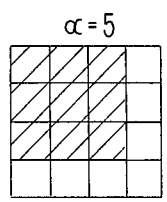
α = 6 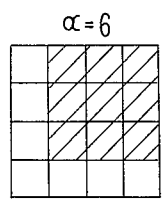
α = 7 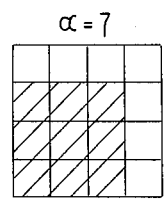
α = 8 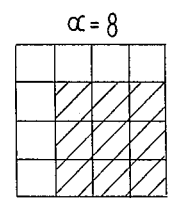
α = 9 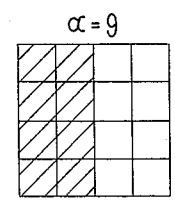
α = 10 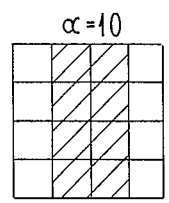
α = 11 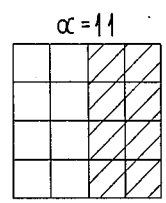
α = 12 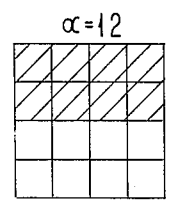
α = 13 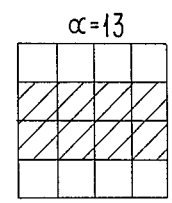
α = 14 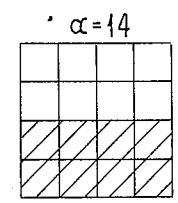
α = 15 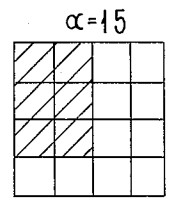
α = 16 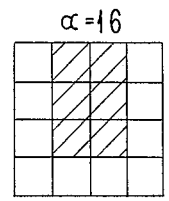
α = 17 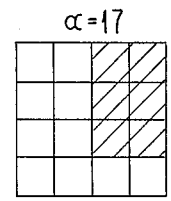
α = 18 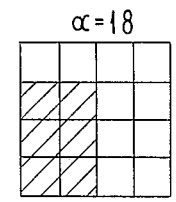
α = 19 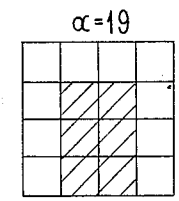
α = 20 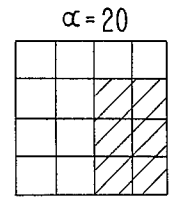
α = 21 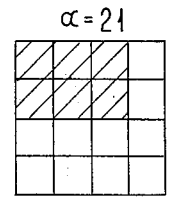
α = 22 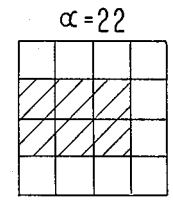
α = 23 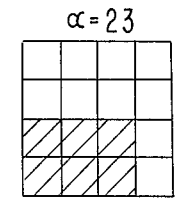
α = 24 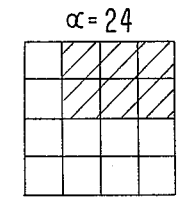
α = 25 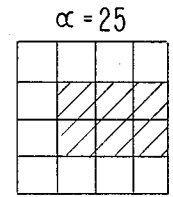
α = 26 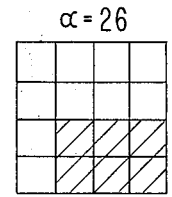
α = 27 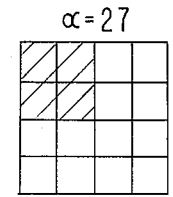
α = 28 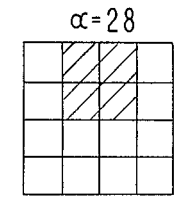
α = 29 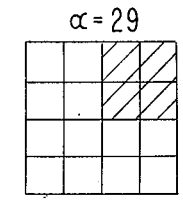
α = 30 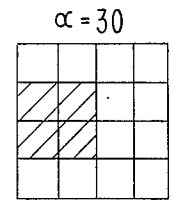
α = 31 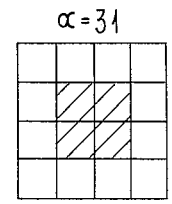
α = 32 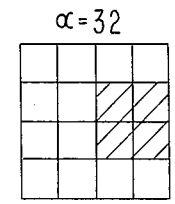
α = 33 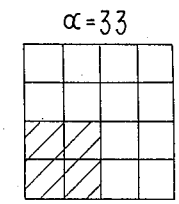
α = 34 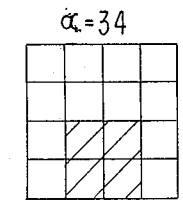

FIG. 4 FORMAT FOR ENCODED GEOMETRIC REFERENCE PATTERNS
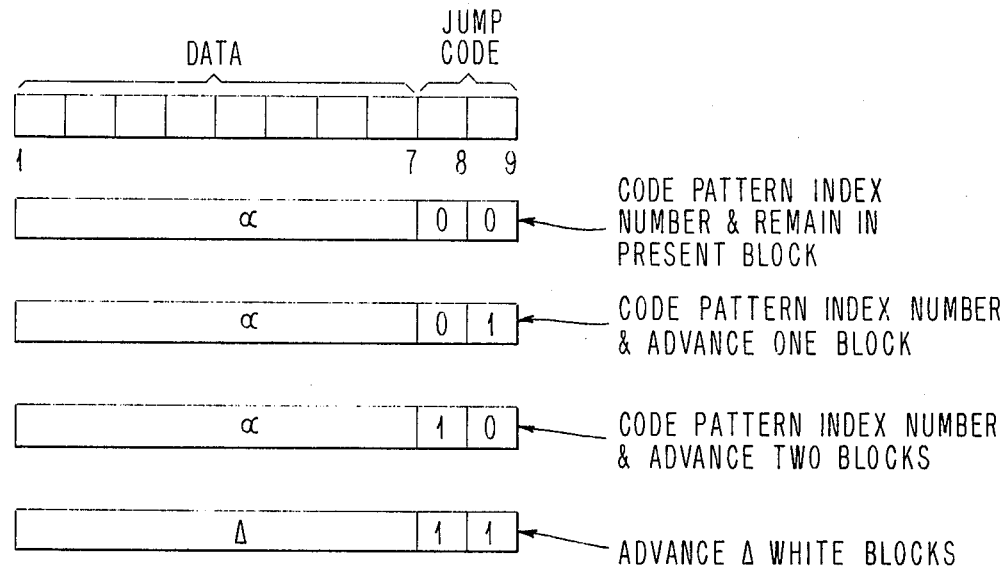
FIG. 7 DATA DECOMPRESSOR
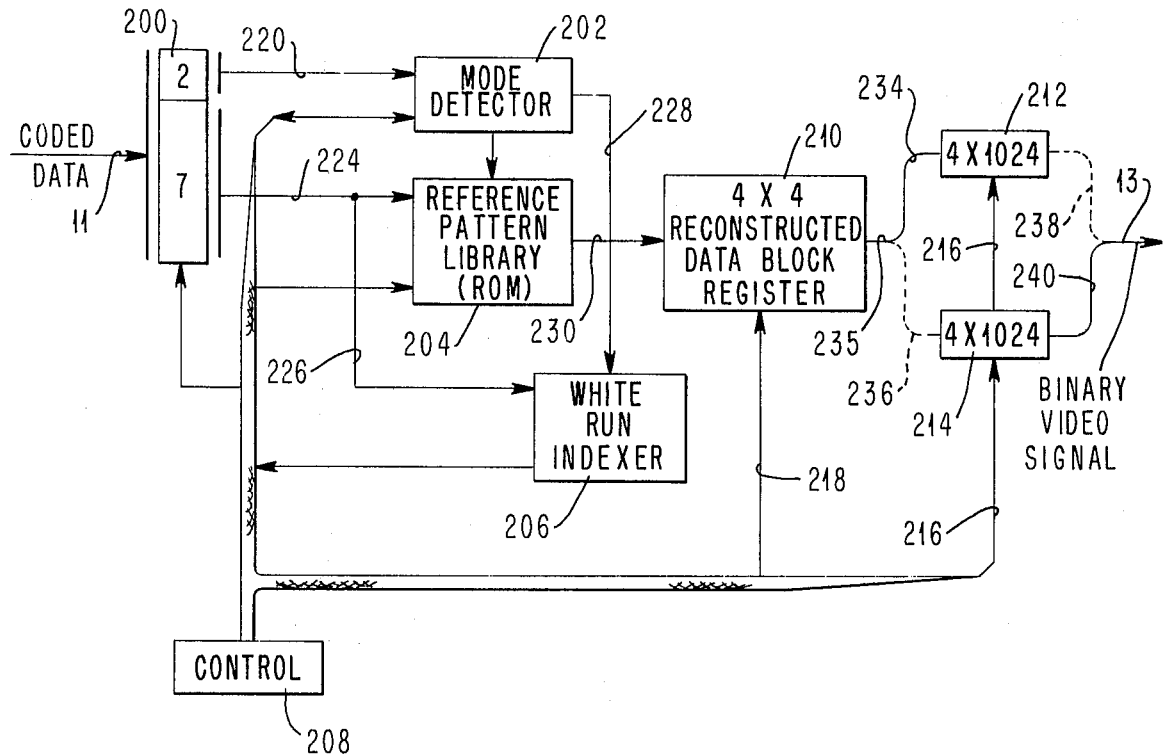

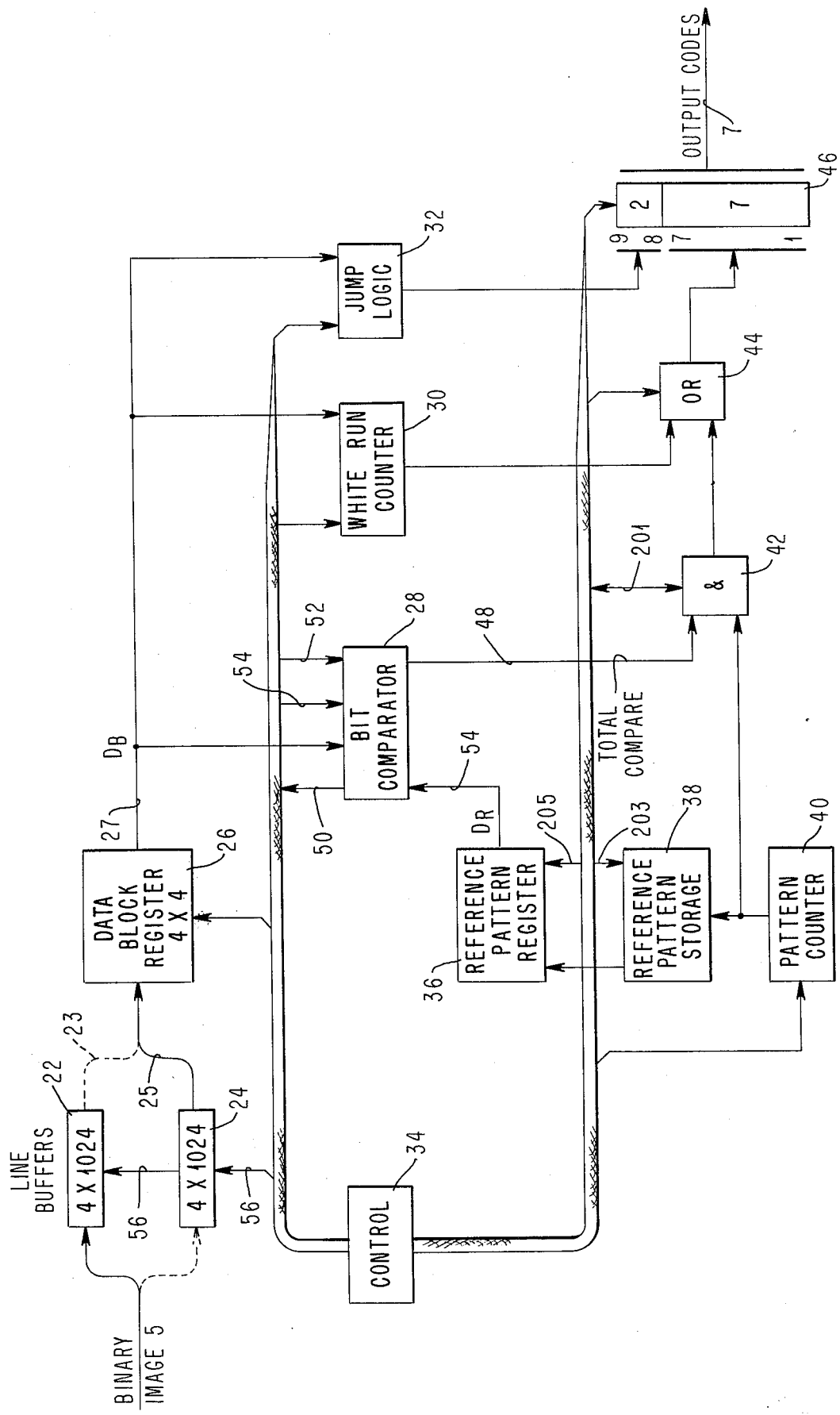
FIG.5  DATA COMPRESSOR

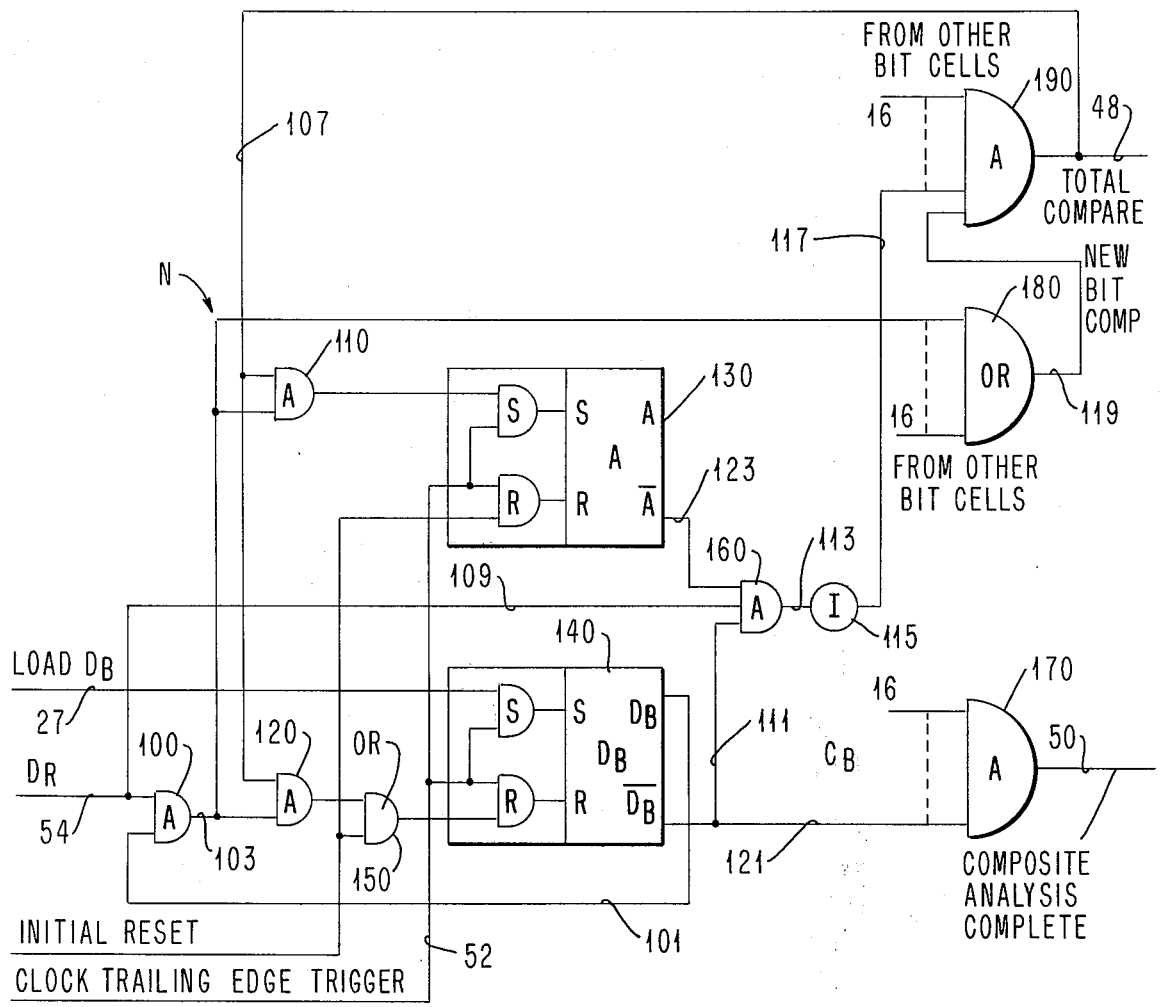
FIG. 6a COMPARATOR LOGIC FOR ONE DATA ELEMENT
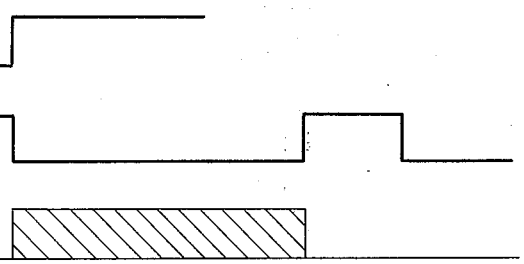
FIG. 6b
LOGIC TIMING
FF CHANGE
CLOCK
DATA CHANGE TIME DURING SHADED REGION ONLY

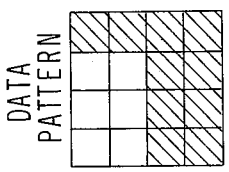

ENCODING LOGIC FOR REDUCED BANDWIDTH PICTORIAL DATA TRANSMISSION SYSTEM

This is a continuation-in-part of application Ser. No. 379,523, filed July 16, 1973, now abandoned.

FIELD OF THE INVENTION

This invention relates to the digital representation of fixed two dimensional images and more particularly to a data compaction method and apparatus for encoding and decoding such images.

BACKGROUND OF THE INVENTION

The transmission of two dimensional images over communication media necessitates the translation of the image into a signal format such that it can be most effectively restored to its two dimensional form at the receiver. Two dimensional images are commonly scanned and converted from an analog representation to a digital representation of the image on a point by point basis. The elements of such a digital signal, representative of each elemental point of the image, usually identify a binary black or white level. Such a digital representation contains large amounts of redundant information. A typical image may require some 500,000 or more electrical points to attain the necessary resolution.

One technique disclosed in the prior art for reducing the redundancy of a point to point image representation is to scan the image in contiguous small areas of successive blocks of elements and to encode those blocks which match one of a selected vocabulary of simple geometric patterns. A problem which arises with such prior art technique is that in order to represent each possible geometric pattern which may occur in a data block, a prohibitively large library of reference geometric patterns must be stored.

OBJECTS OF THE INVENTION

It is an object of the invention to provide an improved image transmission system which reduces the number of reference geometric patterns which must be stored in the system library.

A further object of the invention is to provide an improved image transmission system which will minimize the time-bandwidth product required to transmit high-detail pictorial data.

Another object of the invention is to compact pictorial image data for transmission, storage, or display, in an improved manner.

SUMMARY OF THE INVENTION

These and other objects of the invention are accomplished by encoding each data block in the pictorial image as a composite of simple geometric block patterns. An $n$ by $m$ element data block to be encoded is loaded into a data block register which is connected to an $n$ by $m$ bit comparator. A reference pattern storage containing a plurality of simple geometric block patterns is connected to a reference pattern register which in turn is connected to the bit comparator. The reference patterns are sequentially loaded by the pattern storage into the reference pattern register in the order of greatest to least black element population. The bit comparator checks each reference pattern to determine a match of all populated elements in the reference. When the first match for a reference pattern is found, its number is encoded and prepared for transmission on an output line. If there are no further populated elements in the data block which are left unmatched with the first reference pattern, an indication that the present data block is completely encoded is included in the encoded output and the next data block is loaded into the data block register.

If further populated elements in the data block are left unmatched with the first reference pattern, the location of each encoded element for the first reference pattern is stored in the bit comparator and the first reference pattern encoded with an indication that a next encoded reference pattern will follow which is to be combined with it in a composite shape upon decoding.

The sequential loading of the reference patterns by the pattern store into the reference pattern generator, resumes, still in the order of greatest to least black element population. The bit comparator now checks each reference pattern to determine whether a match of all populated elements in the reference when combined with the elemental locations which have already been encoded for the first reference pattern, can be made with the data block. When a second match for a reference pattern is found, its number is encoded and prepared for transmission on an output line. If there are no further populated elements in the data block which are left unmatched with the first and second reference patterns, an indication that the present data block has been completely encoded is included in the encoded output and the next data block is loaded in the data block register.

If further populated elements in the data block are left unmatched with the first and second reference patterns, the location of each encoded element for the first and second reference patterns is stored in the bit comparator and the second reference pattern encoded with an indication that a next encoded reference pattern will follow which is to be combined with it and the first reference pattern in a composite shape upon decoding. The process of finding the components of a composite geometric shape continues until there are no further black elements in the data block which are left unmatched with the reference pattern which has been encoded. The complex pictorial image in the data block is thereby represented as a composite of simple reference patterns.

When successive data blocks are encountered containing all white elements, a single output word is encoded indicating the number of adjacent all white data blocks by means of run length encoding.

The present invention permits a significant reduction in the number of simple geometric patterns which must be stored in the pictorial data transmission system for accomplishing the desired reduction in the time-bandwidth product. Transmission of the pictorial data image is rendered more efficient by means of the data compaction technique and storage space for the data set is reduced.

DESCRIPTION OF THE DRAWINGS

The foregoing and other objects, features and advantages of the present invention, will be more completely understood from the following description of the preferred embodiments of the invention as illustrated in the accompanying drawings.

IN THE DRAWINGS

Figure 1:
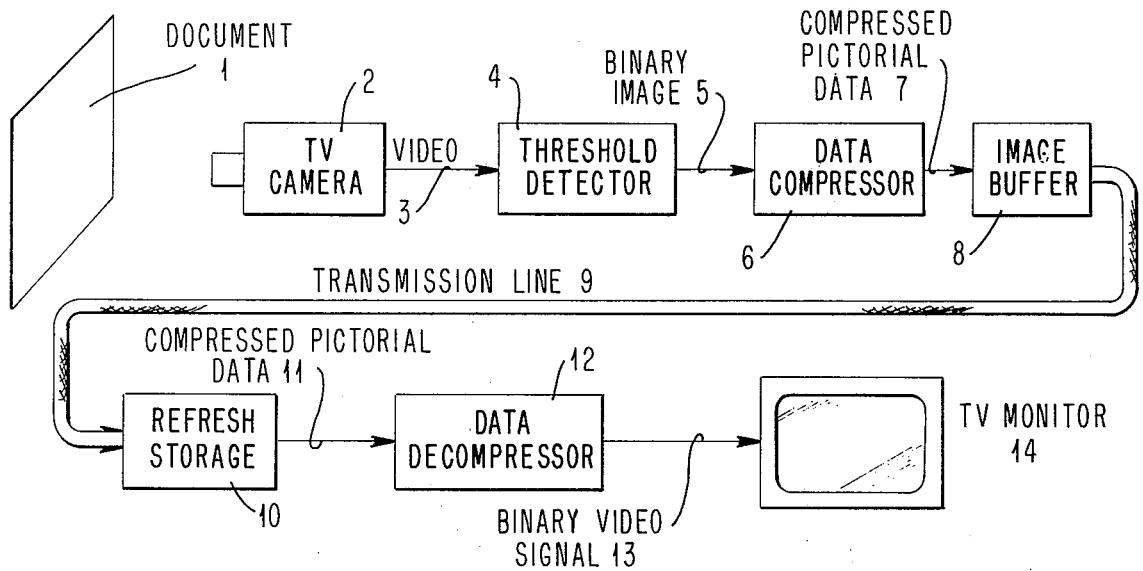

FIG. 1 is a block diagram of the pictorial data transmission system.

Figure 2:
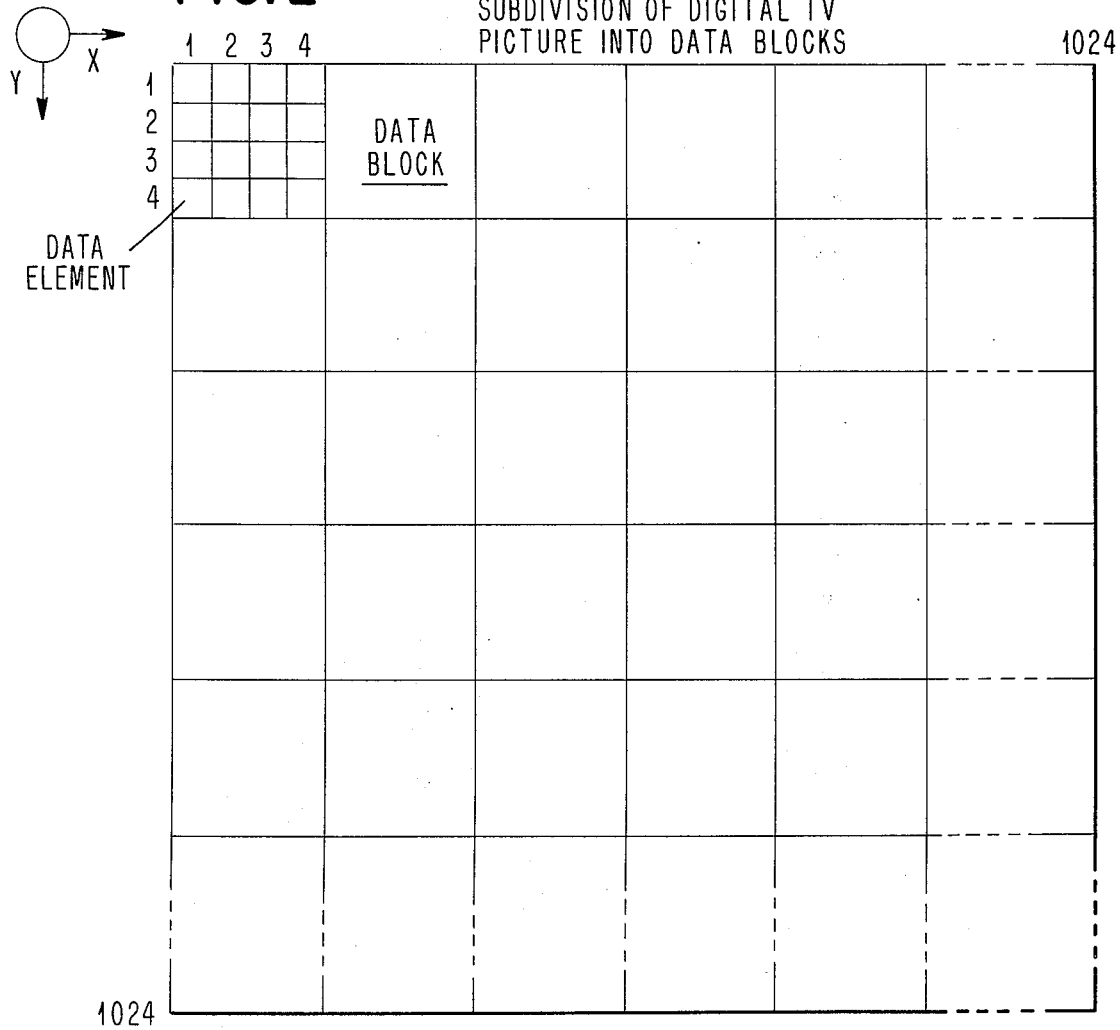
Figure 3B:
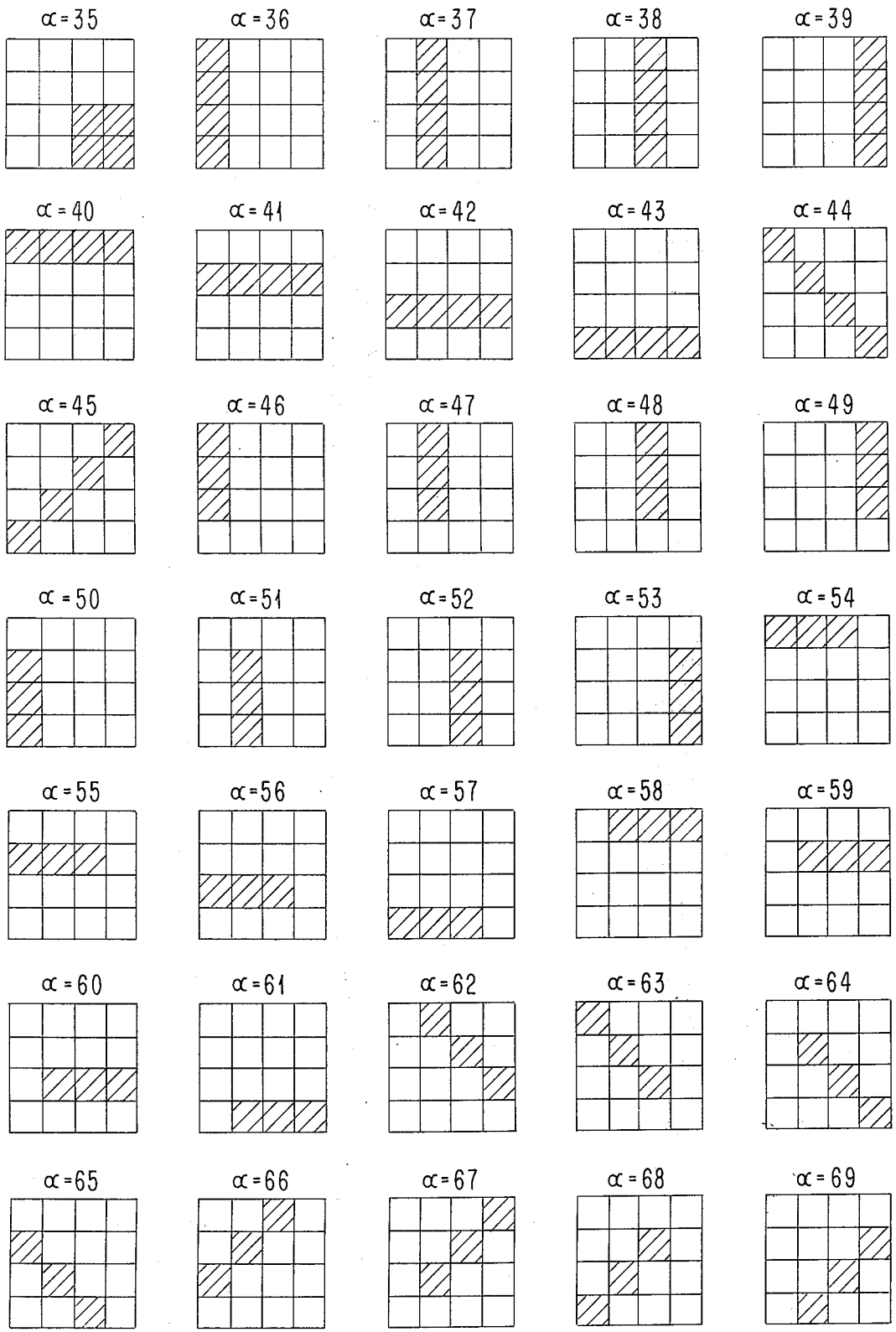
Figure 3C:
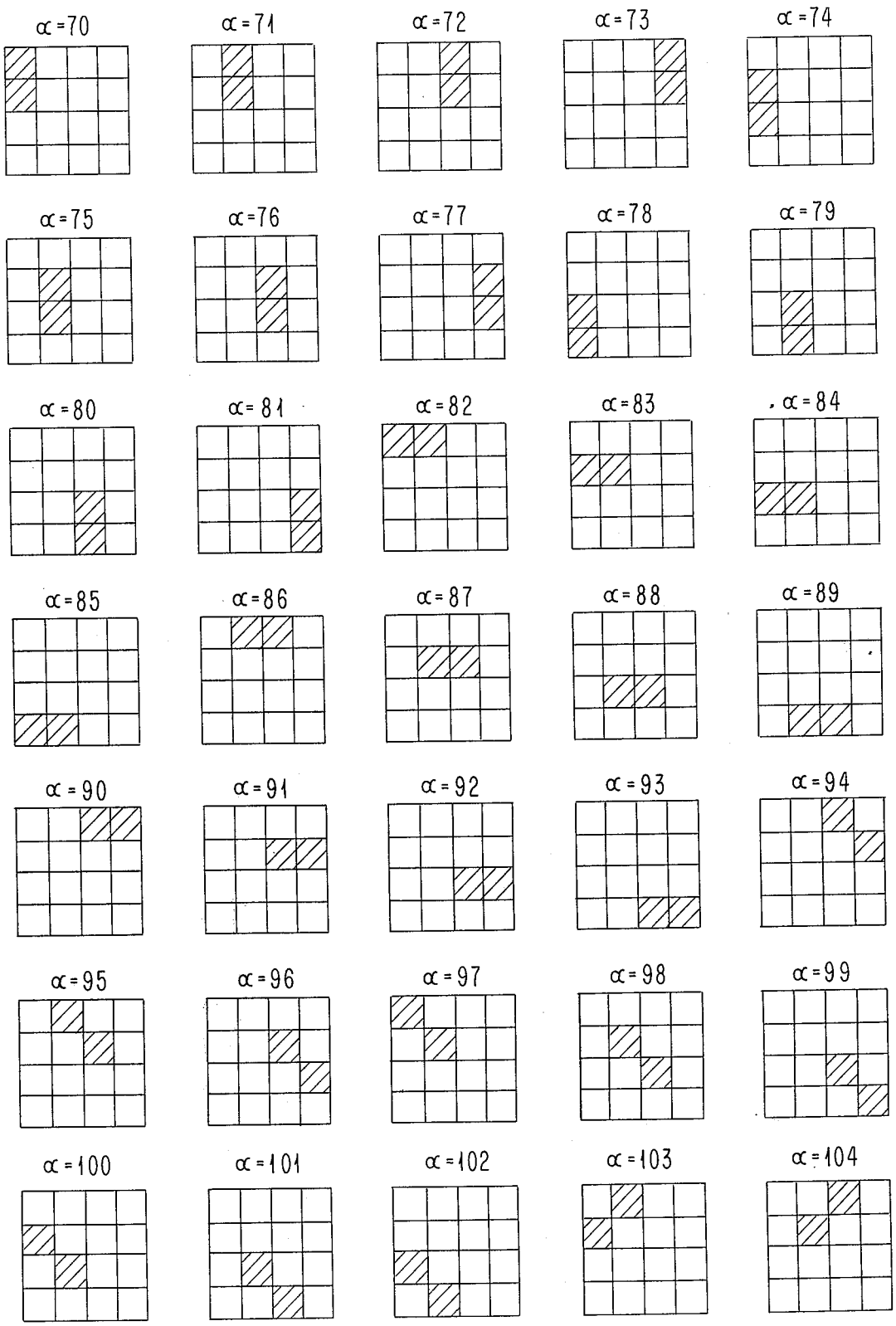
Figure 3D:
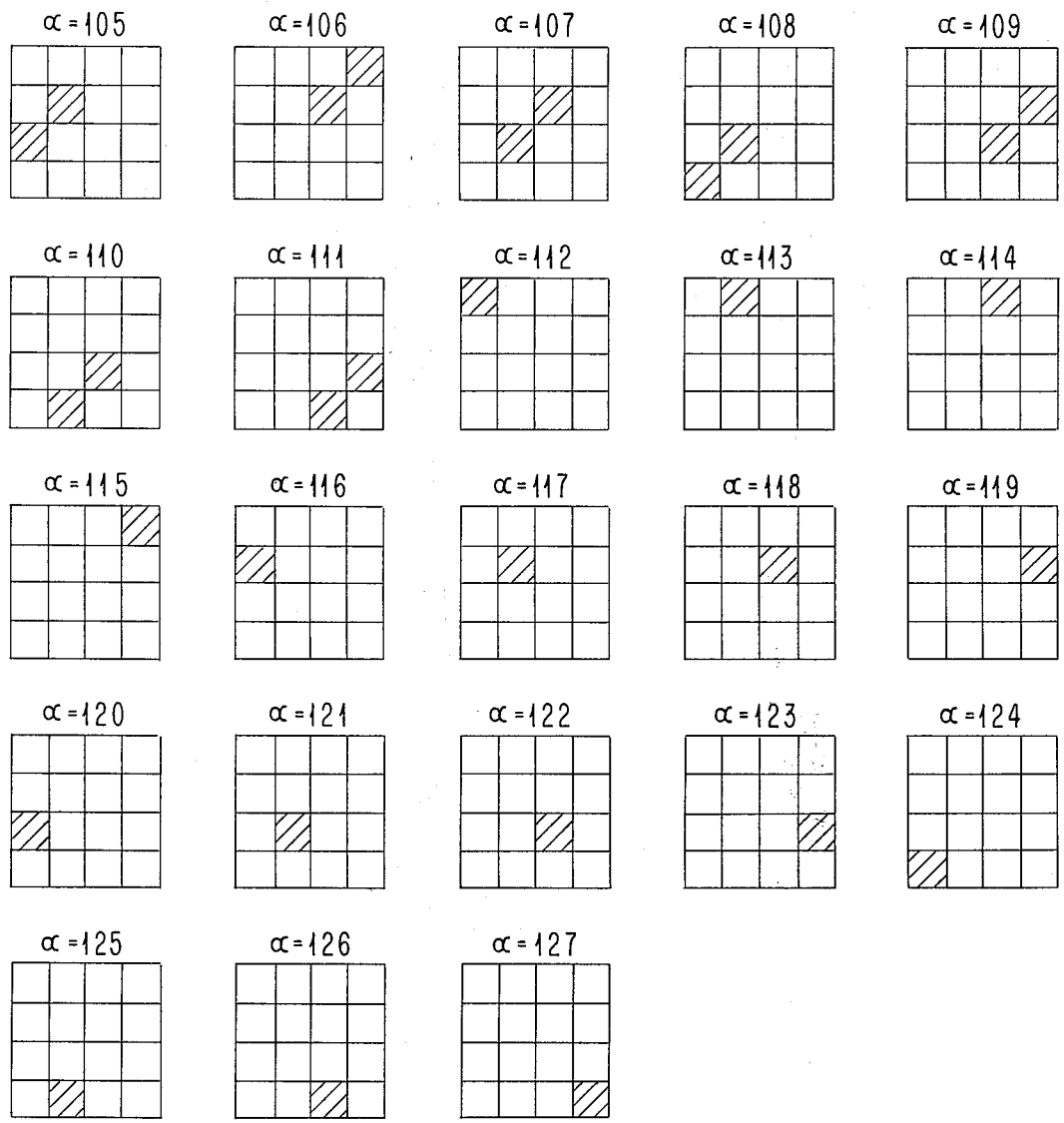

FIG. 2 shows how the digital television picture is subdivided into data blocks, each consisting of a four by four array of picture elements.

FIGS. 3a, 3b, 3c and 3d show the library of simple geometric reference patterns, a selected combination of which will represent a complex geometric form in a data block.

FIG. 4 shows the format for the encoded geometric reference patterns.

FIG. 5 is a block diagram of the data compressor 6 shown in FIG. 1.

FIG. 6a is a logic diagram of the comparator logic, otherwise known as the logic block, for one of the 16 data elements in the bit comparator 28 shown in FIG. 5.

FIG. 6b is a logic timing diagram for the logic shown in FIG. 6a.

FIG. 7 is a block diagram of the data decompressor 12 shown in FIG. 1.

Figure 8B:
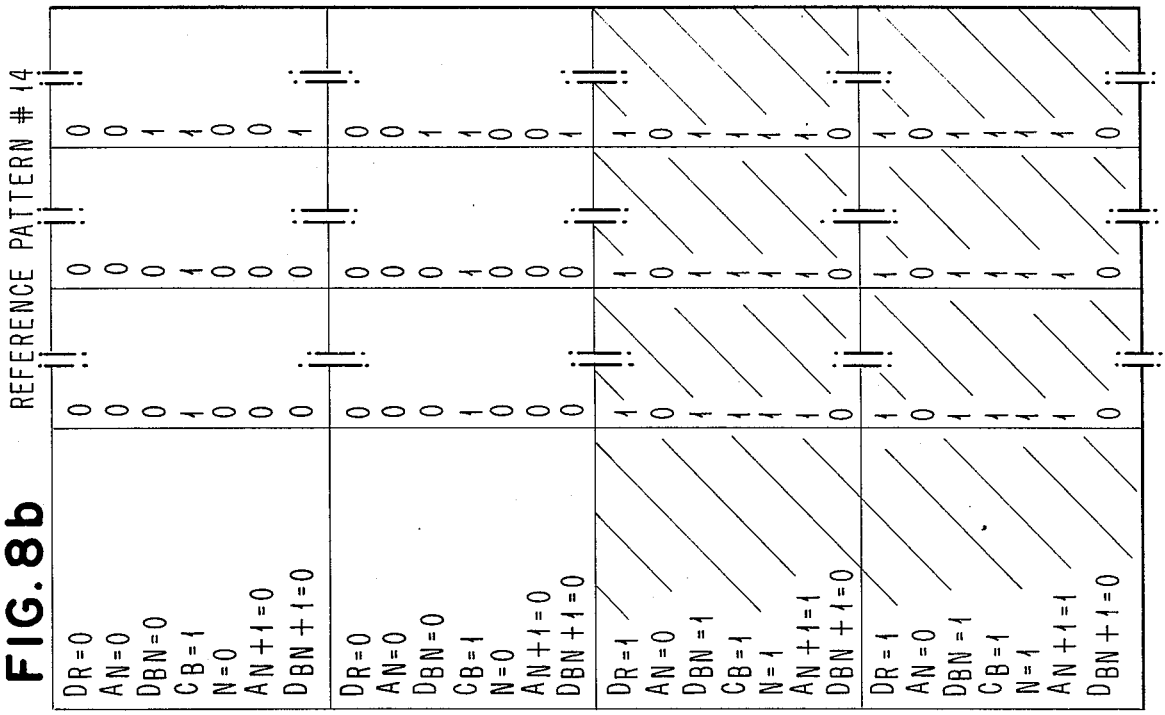
Figure 8A:
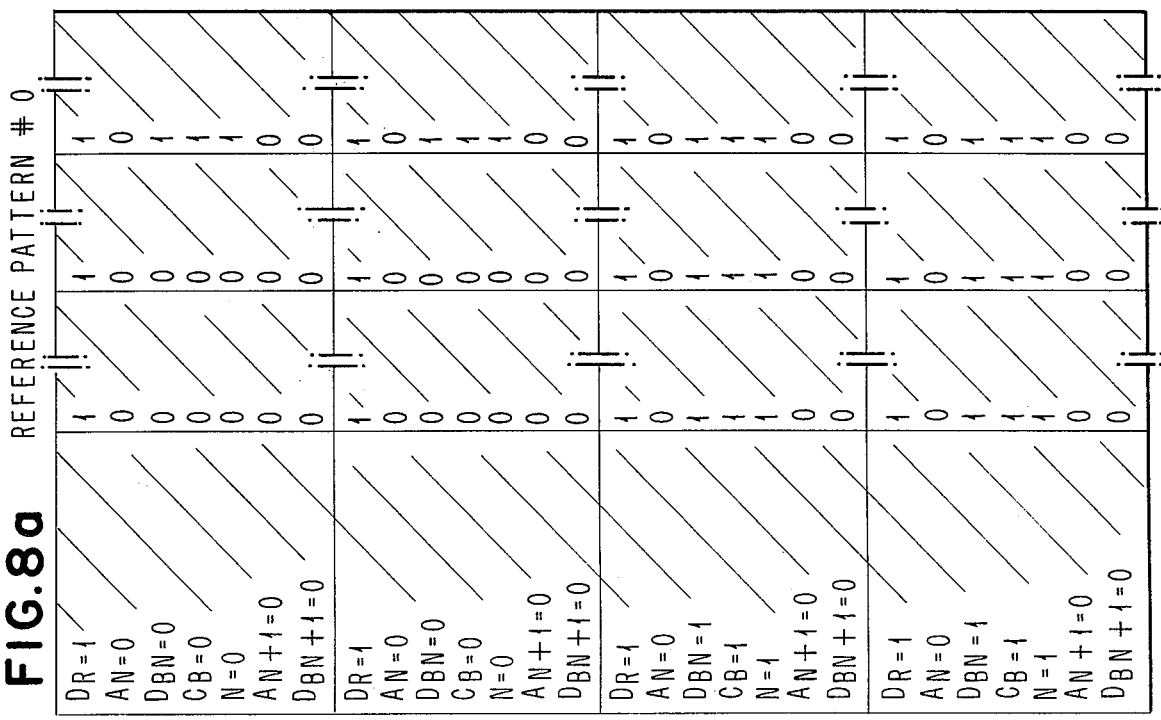

FIG. 8a illustrates the status of the logic variables $D_r$, $A_n$, $D_{bn}$, $C_b$, N, $A_{n+1}$, and $D_{bn+1}$ for each of the 16 data element locations in the bit comparator 28 after a comparison of the reference pattern number 0 with the complex geometric pattern in the data block of FIG. 8e.

FIG. 8b illustrates the status of the logic variables $D_r$, $A_n$, $D_{bn}$, $C_b$, N, $A_{n+1}$, and $D_{bn+1}$ for each of the 16 data element locations in the bit comparator 28 after a comparison of the reference pattern number 14 with the complex geometric pattern in the data block of FIG. 8e.

FIG. 8c illustrates the status of the logic variables $D_r$, $A_n$, $C_b$, N, $A_{n+1}$, and $D_{bn+1}$ for each of the 16 data element locations in the bit comparator 28 after a comparison of the reference pattern number 23 with the complex geometric pattern in the data block of FIG. 8e.

FIG. 8d illustrates the status of the logic variables $D_r$, $A_n$, $D_{bn}$, $C_b$, N, $A_{n+1}$, and $D_{bn+1}$ for each of the 16 data element locations in the bit comparator 28 after a comparison of the reference pattern number 39 with the complex geometric pattern in the data block of FIG. 8e.

FIG. 8e illustrates a sample complex geometrical pattern or pictorial data image stored in the data block 26.

Figure 9:
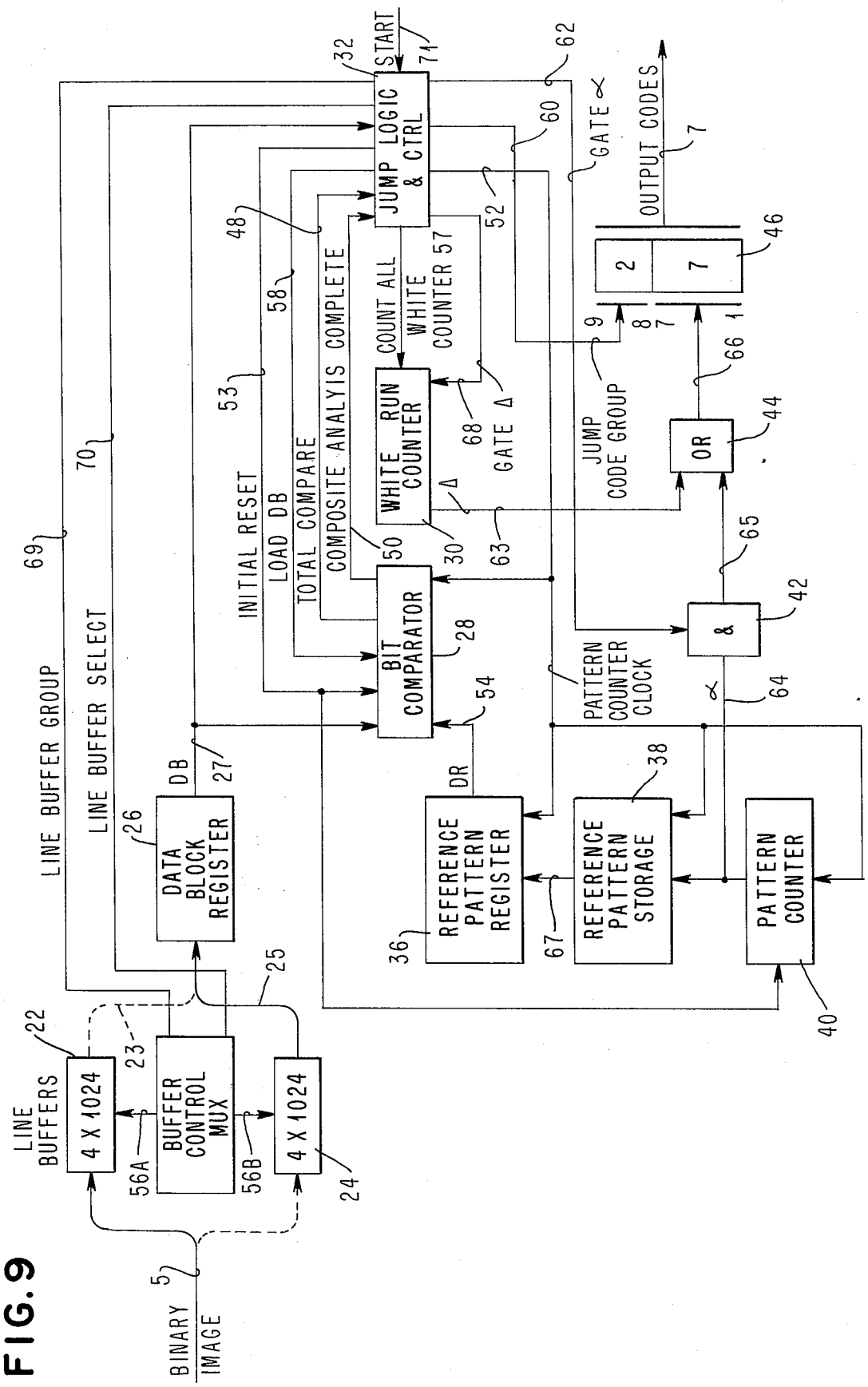

FIG. 9 is a detailed block diagram of the control network for the data compressor of FIG. 5.

Figure 10:
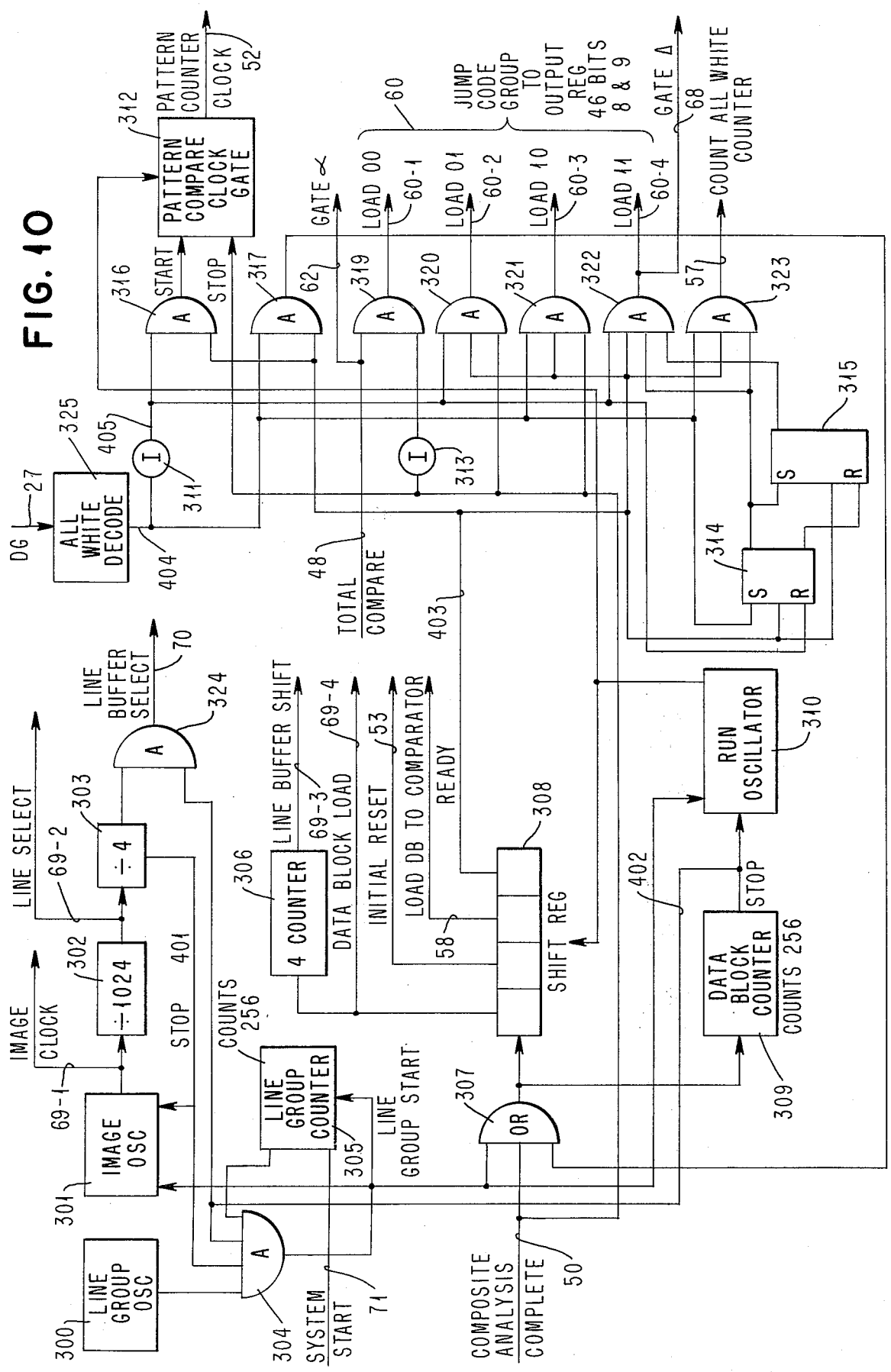

FIG. 10 is a detailed block diagram of the control hardware in the jump logic 32 of a data compressor of FIG. 5.

Figure 11:
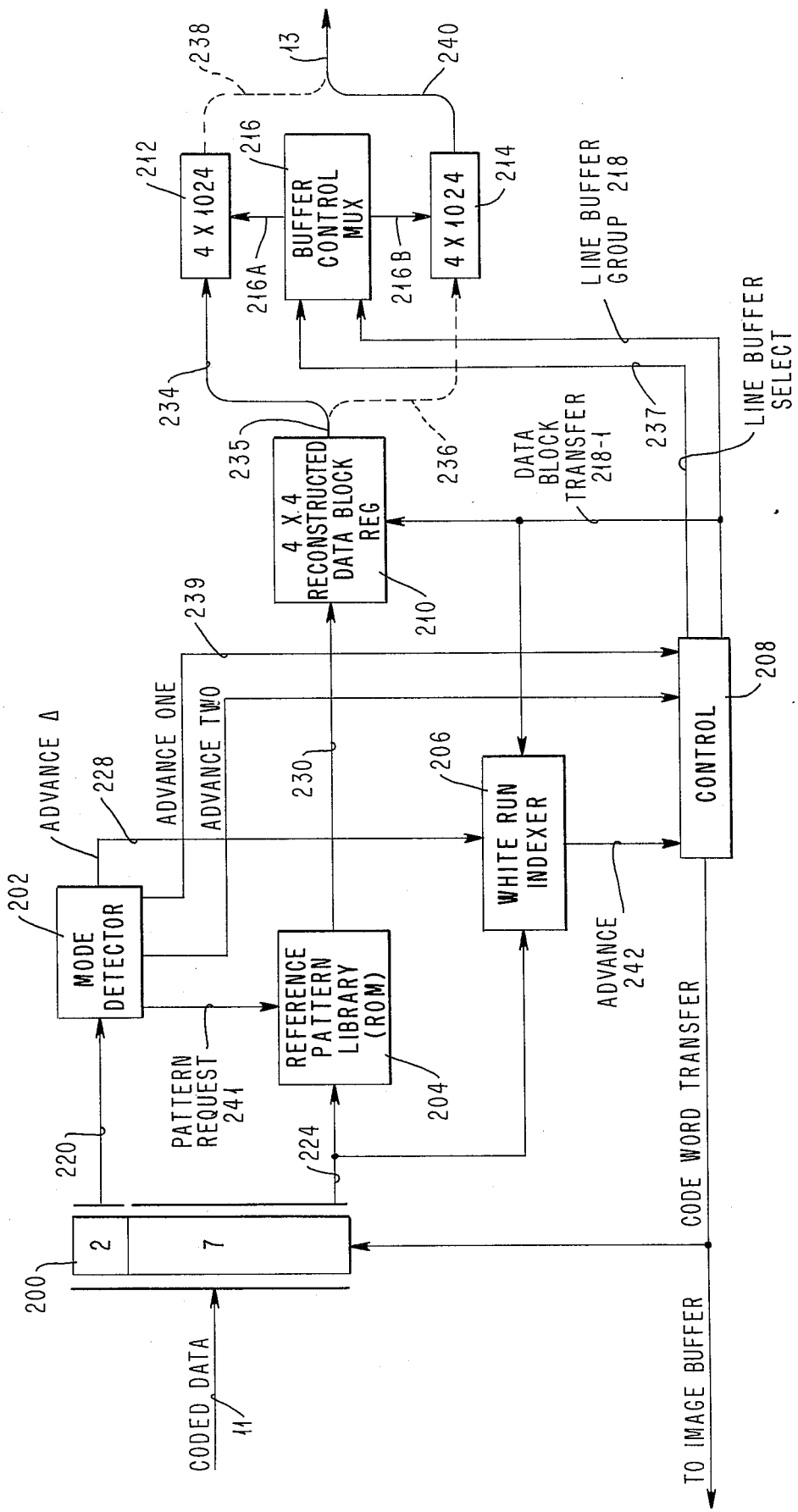

FIG. 11 is a diagram of the control network for the data decompressor of FIG. 7.

Figure 12:
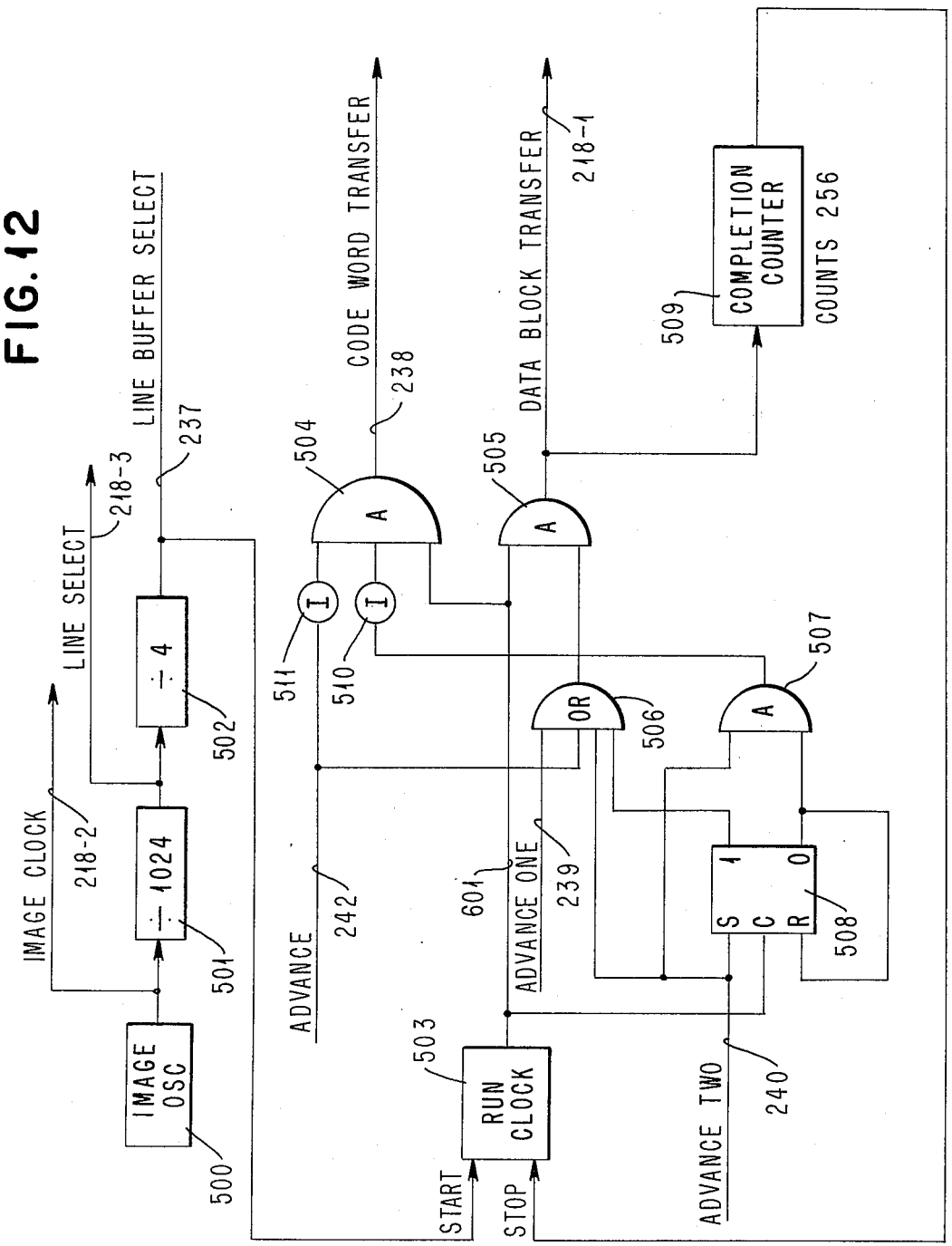

FIG. 12 is a detailed block diagram of the hardware for the control 208 for the data decompressor of FIG. 7.

DISCUSSION OF THE PREFERRED EMBODIMENT

The representation of the complex geometrical pattern in a data block by means of a composite of simple geometric reference patterns is accomplished by the encoding logic disclosed herein.

The pictorial data transmission system is shown in FIG. 1. Such a system would be employed, for example, in a facsimile transmission application or a pictorial data storage application. The document 1, having human readable printing thereon, is televised by means of the digital television camera 2, which outputs on line 3 a conventional gray level video output. The threshold detector 4 converts the gray level video output on line 3 into a binary image video output on line 5 which is directed to the data compressor 6. The data compressor in turn, subdivides the 1024 by 1024 element picture into 216 by 216 data blocks, each containing 16 data elements as is shown in FIG. 2. The data compressor, whose detailed block diagram is shown in FIG. 5, sequentially compares the series of a selected vocabulary of simple geometric patterns shown in FIG. 3, with the pattern of black elements in the data block. The library of reference patterns of FIG. 3 are compared in the order of most black to least black. The bit compare logic shown in FIG. 6a for the bit comparator shown in FIG. 5 of the data compressor 6, determines when all the elements of a first reference pattern compare with the elements present in the data block 26 of FIG. 5. The first reference pattern successfully matched by the bit comparator 28 is encoded by outputting the reference pattern number from the pattern counter 40 through the AND gate 42 to the output register 46. Output register 46 is organized in the format shown in FIG. 4. Positions 1 through 7 in the output register 46 will contain the code pattern index number and locations 8 and 9 of the output register 46 will contain the jump code generated by the jump logic 32 of FIG. 5. The bit compare logic of the bit comparator 28 determines whether any bit locations in the data block are leftover after the comparison with the first reference pattern. If there are leftover elements, as will be indicated by an absence of a signal on line 50, the jump logic 32 will load a O into the 8th position and a O into the 9th position of the output register 46 with the format shown in FIG. 4. This will indicate that the present encoded pattern is one member of a composite and thus when decoding of the pattern word takes place, the decoder will not index to the next data block, but will remain in the existing data block to accept the next geometric pattern output by the data compressor. The first reference pattern, thus encoded is outputted on the output line 7 to the image buffer 8 shown in FIG. 1.

The leftover elements are matched with a second reference pattern which in turn is encoded and transmitted on the output line 7. The matching process will continue until the complex geometric pattern stored in the data block 26 has been completely encoded as a composite of simple geometric reference patterns drawn from the library of patterns shown in FIG. 3. All reference patterns matched are encoded and sequentially transmitted on the output line 7 for transmission over the transmission line 9 and storage in the refresh storage 10. Refresh storage can be either a core or a solid state memory capable of handling non-periodically occurring inputs and outputs. The data compressor of FIG. 5 operates in a second mode when successive data blocks are encountered containing all white elements. A single output word is encoded indicating the number of adjacent blocks having no black elements therein. To operate in this mode, the jump logic 32 of the data compressor of FIG. 5 detects the condition of having no black elements in the data block register 26 and increments the white run counter 30. The incrementation of the counter continues so long as successive data blocks are encountered containing no black elements. The maximum capacity for output data register 46 is 128. When the first non-all white block is encountered after delta successive all white blocks or after 128 successive all white data blocks have been encountered, the white space counter outputs its counter contents as the value delta, by means of the OR gate 44 to the output data register 46 in locations 1–7. The jump code logic 32 then loads a 1 into position 8 and a 1 into position 9 to indicate that the encoded word is to command the decoder to advance delta white blocks as is shown in the format for encoded output words shown in FIG. 4. The encoded word is outputted on line 7 to the image buffer 8. The dual modes of representing complex geometrical patterns in a 4 by 4 data block as a composite of simple geometric reference patterns and the run length encoding of successive white blocks, permits a significant reduction in the number of simple geometric patterns which must be stored in the pictorial data transmission system, reduces the necessary time-bandwidth product of the transmission line 9 which is necessary to transmit the pictorial data, and compacts the data which must be stored in the refresh storage 10. Refresh storage 10 outputs the compressed pictorial data on line 11 to the data decompressor 12, a detailed block diagram of which appears in FIG. 7. In the data decompressor, the encoded reference patterns and the run-length encoded white spaces are distinguished by their associated jump codes which are loaded into the mode detector 202 which determines whether the reference pattern library 204 will load a specified simple geometric reference pattern into the reconstructed data block register 210 or whether the white run indexer 206 will indicate to control 208 that delta successive white spaces are to be skipped. When the data word of FIG. 4 contains zeros in positions 8 and 9 signifying that a composite of reference patterns is to be formed, the mode detector 202 signals the control 208 to hold the first reconstructed reference pattern in data block register 210. The next encoded reference pattern is called out of the pattern library 204 by the next data word received on line 11. The second pattern is superimposed on the first reference pattern which was reconstructed in data block register 210. The composite pattern thus formed then represents the desired complex pictorial data image. This reconstructed data block is outputted on line 235 to the output ping-pong register 212–214, which supplies the binary video signal outputted on line 13 to the TV monitor 14 for display.

DETAIL STRUCTURE FOR THE BIT COMPARATOR

The bit comparator 28 of FIG. 5 is a 4 by 4 bit pictorial data image comparator. The size of the comparator is not necessarily limited to 4 by 4 and can be an arbitrary size $n \times m$. Comparator 28 compares a complex arrangement of black elements in a 4 by 4 element pictorial data image or data block stored in the data block register 26, with simple arrangements of black elements in each of a sequence of 4 by 4 element, simple reference patterns which are sequentially loaded into the reference pattern register 36 by means of the reference pattern storage 38. The index number alpha of each reference pattern loaded into the reference pattern register 36 is maintained in the pattern counter 40. When the bit comparator 28 determines that the simple reference pattern presently loaded in the reference pattern register 36 has no black elements which do not compare with black elements in the pictorial data image stored in the data block register 26, and at least one of the black elements in the simple reference pattern is found to compare with a black element of the pictorial data image, which has not been previously found to compare, a component of a composite representation of the pictorial data image has been found. The bit comparator 28 then transmits the total compare output signal on line 48 to the jump logic 32 which in turn gates the index number alpha for the simple reference pattern presently located in the reference pattern register 36, to the output code register 46.

The bit comparator 28 comprises a 4 by 4 array of data element compare, logic blocks such as is shown in FIG. 6a. Each such logic block has a data input 27' connected to one of the 4 by 4 data element input lines 27 for accepting a data element of which the pictorial data image is composed. Each data element compare, logic block has a reference input 54' for accepting a reference pattern element of which one of a sequence of reference patterns is composed, over the reference pattern element input line 54.

The bit comparator 28 contains a new bit compare OR gate 180 having 4 by 4 input lines 105, each of which is connected to the new bit compare output 105' of a separate one of the data element compare logic blocks of FIG. 6a. The new bit compare OR gate, gates an output new bit compare signal on the new bit compare line 119 when an input new bit compare signal N has been received over one of the new bit compare input lines 105. This indicates that a black element of one of the simple reference patterns stored in the reference pattern register 36, is found to compare with a black element of the pictorial data image stored in the data block register 26, which has not been previously found to compare, for a component simple reference pattern having no black elements which do not compare with the black elements in the pictorial data image stored in the data block register 26.

The bit comparator 28 also contains a total compare AND gate 190 which is shown in the FIG. 6a having (4 by 4)+1 input lines. One of these input lines is the new bit compare line 119 from the output of the new bit compare OR gate 180. Each of the other 4 by 4 lines 117 is connected to a compare output 117' of a separate one of the data element compare, logic blocks shown in FIG. 6a. The total compare AND gate 190 gates a total compare signal on a total compare output line 48 to the AND gate 42. This gating occurs when a component reference pattern loaded into the reference pattern register 36 is found by the bit comparator 28 to have no black elements which do not compare with black elements in the pictorial data image stored in the data block register 26. The total compare signal on line 48 causes the jump logic 32 to direct AND gate 42 to transfer the index number alpha corresponding to the reference pattern presently stored in the reference pattern register 36, to the output code register 46 as a part of the encoded word representing the component reference pattern. Information that the component reference pattern has been found is transmitted over line 48 to the jump logic 32. This information is combined with the lack of a corresponding signal output on line 50 from the bit comparator 28 indicating that the composite analysis is not complete, which causes the jump logic 32 of FIG. 5 to load a 0 in the 8th and 9th fields of the output code register 46. As is shown in FIG. 4, 0's is fields 8 and 9 indicate that the code pattern index number alpha occupies fields 1–7 and that the reference pattern so encoded is one of a sequence of reference patterns in a composite representation and as such will be followed by at least one more component reference pattern.

The total compare output line 48 from the total compare AND gate gate 190 is connected to the total compare output 107' of each of the 4 by 4 data element compare, logic blocks of FIG. 6a and causes the storage of an indicium in the A flip flop 130 of each of those logic blocks wherein a new bit compare signal N is transferred to the new bit compare OR gate 180 over the respective lines 105. If a particular data element is a black element, the DB flip flop 140 is set by the data element input line 27. When the first reference pattern including the subject data element is encoded, the total compare signal generated on line 48 and transmitted over line 107 will be on and the new bit compare signal N on line 105 will be on, thereby conditioning the A AND gate 110 and the DB reset AND gate 120. These AND gates act in combination to transfer the set condition of the DB flip flop over to a set condition in the A flip flop 130. This is the indicium which is stored the first time that the subject data element is encoded. The data element is a black data element and is a member of a reference pattern which is encoded as a component of the composite reference patterns which are to represent the pictorial data image stored in the data block register 26.

A flip flop 130 and the DB flip flop 140 are driven by a clock with a trailing edge trigger over line 52. FIG. 4b shows the logic timing for the flip flop and indicates that the flip flop change occurs at the trailind edge of a clock pulse and that data may change only during the period between clock pulses.

A composite completion AND gate 170 is contained in the bit comparator 28 and has 4 by 4 input lines, each of which is connected to a completion output 121' of a separate one of the data element compare logic blocks of FIG. 6a. The composite completion AND gate 170 gates a composite completion signal on an output line 50 to the control 34 of FIG. 5. Output signal is gated when no further black elements in the pictorial data image which are stored in the data block register 26, remain unmatched to the black elements in all of the component reference patterns which have been identified.

Each data element compare logic block of FIG. 6a contains a first or DB flip flop 140, a non-compare AND-INVERT gate 160, a reset AND gate 120, a set AND gate 110, and a second or A flip flop 130.

The first or DB flip flop 140 has its set line as the data input 27' to one of the 4 by 4 data element input lines 27. The DB flip flop stores an indicium that the data element is a black element when the single data element input line 27 is on. The DB flip flop 140 has its off state output as the completion output 121' connected to the input line 121 of the composite completion AND gate 170.

Each data element compare logic block of FIG. 6a has a new bit compare AND gate 100 with a first input line as the reference input 54' connected to one of the 4 by 4 reference pattern element input lines 54 and a second input line 101 connected to the on-state output of the DB flip flop. The outputs of the new bit compare AND 100 is the new bit compare output 105' connected to the input line 105 of the new bit compare OR gate 180. When a particular data element is a black element, an on signal resides on the data element input line 27. When a given reference pattern has a black element in its corresponding location, an on signal resides on the reference pattern element input line 54. When both lines 27 and 54 are in the on state, the DB flip flop 140 is in a set position, its set-output line 101 is on and combines with the on condition of the reference pattern element input line 54 to condition the new bit compare AND gate 100 into its on-state. The new bit compare output line 103 goes on and conditions the new bit compare OR gate 180 into its on-state by virtue of the signal N on line 105. The new bit compare signal from the OR gate 180 is then transmitted over line 119 to the total compare AND gate 190. This action will occur every time black data elements occur in corresponding locations in the data block register 26 and in the reference pattern register 36 until the first total compare for a first reference pattern containing the subject data element takes place. At that time the DB flip flop 140 will be reset and the A flip flop 130 will be set, preventing the new bit compare AND 100 from turning on.

Each data element compare, logic block of FIG. 6a contains a non-compare AND-INVERT gate 160 having a first input line 109 connected to the reference pattern element input line 54, a second input line 111 connected to the off-state output of the DB flip flop 140 and a third input line 123 connected to the off-state output of the A flip flop 130. Gate 160 has its output inverted by the inverter 115 and the compare output line 117 is connected to the input of the total compare AND gate 190.

Each data element compare, logic block of FIG. 6a contains a reset AND gate 120 having a first input line 103 connected to the output of the new bit compare AND gate 100 and a second input line 107 as the total compare input connected to the output of the total compare AND gate 190.

Each data element compare, logic block contains a set AND gate 110 having a first input line 105 connected to the output of the new bit compare AND gate 100 and a second input line 107 as the total compare input connected to the output of the total compare AND gate 190.

Each data element compare, logic block of FIG. 6a contains an A flip flop 130 with its set line connected to the output of the set AND gate 110 and its off-state output 123 connected as a third input to the non-compare AND-INVERT gate 160. The A flip flop stores an indicium that the data element is black and has been compared with a corresponding black element in a component reference pattern having no black elements which do not compare with the black elements in the pictorial data image stored in the data block register 26.

The operation of each data element compare logic block of FIG. 6a can be concisely described by a truth table wherein $D_r$ represents the binary value for the presence of the black element in the reference pattern element input 54, the binary variable $A_n$ represents the on-state of the A flip flop 130, the binary variable $D_b$ represents the presence of a black element in the data element on data element input line 27 and on the on-state of the DB flip flop 140, the binary variable $C_b$ represents a compare output signal on line 117, the binary variable N represents a new bit compare signal on line 105. Where the binary variables A or $D_b$ are subscripted with an $n$, that variable indicates the condition of the A flip flop or the DB flip flop respectively before the clock line 52 is triggered and where the binary variables A or $D_b$ are subscripted with an $N+1$, it indicates that state of the A flip flop or the DB flip flop, respectively after the clock line 52 has been triggered. The following table is a truth table for one data element compare, logic block a FIG. 6a.

TRUTH TABLE

| $D_r$ | $A_n$ | $D_{bn}$ | $C_b$ | N | $A_{n+1}$ | $D_{bn+1}$ |
|---|---|---|---|---|---|---|
| 0 | 0 | 0 | 1 | 0 | 0 | 0 |
| 1 | 0 | 0 | 0 | 0 | 0 | 0 |
| 0 | 0 | 1 | 1 | 0 | 0 | 1 |
| 1 | 0 | 1 | 1 | 1 | 1 | 0 |
| 0 | 1 | 0 | 1 | 0 | 1 | 0 |
| 1 | 1 | 0 | 1 | 0 | 1 | 0 |
| | 1 | 1 | | NOT | USED | |

An equation representing the truth table is $C_b = AD_BD_r$. A condition always met by the truth table is $A_{SET} = Db_{RESET} = N = D_R D_B$. Where A and $D_b$ are both 0 if the bit is 0. Where A and $D_b$ are 0 and 1, respectively, the bit is 1 but has not been encoded. Where A and $D_b$ are 1 and 0 respectively, the bit is 1 and has been encoded. The total block compare signal is formed by ANDing all the bit compare signals $C_b$ together on the lines 117 and satisfies the total compare AND gate 190 only if there is a new bit compare signal N from one or more of the bit compare logic blocks. Completion of the composire is detected by the composite analysis complete AND gate 170 when all 16 of the DB flip flops are set in their off-state. At the start of a compare for a given pictorial data block, all the A flip flops and DB flip flops are reset by means of the initial reset line 53 from the jump logic 32 and then the $D_B$ flip flops are set to the pattern of black elements in the data block register 26.

OPERATION OF THE BIT COMPARATOR

The operation of the bit comparator 28 of the data compressor of FIG. 5 can be illustrated by identifying and encoding a sequence of simple reference patterns selected from the library of FIG. 3, which in combination forms a composite representation of the complex pictorial data image stored in the data block register 26. An example of a 4 by 4 bit complex data pattern is shown in FIG. 8e. To facilitate describing the bit locations for the data elements in the data pattern of FIG. 8e, reference is here made to FIG. 2. The upper left hand corner of FIG. 2 shows a data block which has been subdivided into 16 data elements. The data elements are organized into columns numbered from left to right from 1 to 4 and in rows numbered from top to bottom from 1 to 4. It is convenient to refer to specific data elements within the data block by using conventional matrix notation. For example, the upper leftmost data element would be denominated the 11 element and the upper rightmost data element would be denominated the 14 element, the leftmost element in the second row from the top would be denominated the 21 element and the rightmost element in the second row from the top would be denominated the 24 element, and so on. The elements for the data pattern of FIG. 8e and for the reference patterns of FIGS. 8a through 8d will be so denominated.

In our example, let us suppose that the line buffer 24 has just loaded the 4 by 4 bit data pattern of FIG. 8e into the data block register 26 under the control of jump logic 32 of FIG. 5. Jump logic 32 then causes the initial reset signal on line 53 to reset all of the A flip flops 130 and the DB flip flops 140 in the bit comparator 28. Jump logic 32 then causes the data block register 26 to output on its 4 by 4 array of output lines 27, the data element input data for each of the respective DB flip flops 140 in the 16 data element compare, logic blocks of FIG. 6a. Every data element compare logic block corresponding to a black element present in the data block register 26, will have its $D_B$ flip flip 140 placed at set-state. Thus, it is seen in FIG. 8a that the binary variable $D_{bn}$ is equal to 0 in the 11, 12, 13, 21, 22 and 23 elements and the binary variable $D_{bn}$ is equal to 1 in the 14, 24, 31, 32, 33, 34, 41, 42, 43, and 44 elements. At this stage the white run counter 30 having the 4 by 4 data element input line 27 as an input, determines whether the data block word in the data block register 26 contains no black elements. If such is the case, a white space counter is indexed, the jump logic 32 detects the all white condition, and the next data block in the line buffer 24 is loaded into the data block register 26. If the next data block is again all white, the white run counter is incremented a second time. If that next data block is not all white, the jump logic 32 loads a 1 in position 8 and a 0 in position 9 of the jump code in the output code register 46 indicating that the code pattern index number stored in positions 1 to 7 is to be decoded and then the decoder is to advance 2 blocks. If a sequence of all white data blocks is encountered in the data block register 26, the jump logic 32 causes the white run counter 30 to count the number of adjacent all white data blocks and when the first non-all white data block is encountered, the jump logic 32 causes the white run counter to output the number of adjacent all white data blocks as the value delta, to the output code register 46 at positions 1 to 7. At the same time the jump logic 32 loads a 1 in each of positions 8 and 9 of the jump code in output code register 46. This jump code indicates that the decoder is to advance delta blocks. Thus, the all white data blocks are run length encoded.

In the present example, the data pattern of FIG. 8e is not all white and therefore, a normal reference pattern sequential comparison will be performed. The jump logic 32 causes the reference pattern 38 to load reference pattern number 0 as is shown in FIG. 3 and FIG. 8a into the reference pattern register 36. The pattern counter 40 is set equal to 0 at this time. The location of each black element in the reference pattern number 0 now in the reference pattern register 36, is indicated by the on-condition for each of the 16 reference pattern element input lines 54. Thus, in FIG. 8a it is seen that the binary variable $D_r$ is equal to 1 for all 16 of the reference pattern elements. The binary variable $A_n$ indicating the state of the A flip flop before the clock trigger on line 52, is 0 since all of the A registers were reset by the initial reset signal 53 prior to commencement of the comparison sequence. It is seen that the binary variable $C_b$ indicating a bit comparison for an element is equal to 0 for the 11, 12, 13, 31, 22 and 23 elements and is equal to 1 for the 14, 24, 31, 32, 33, 34, 41, 42, 43, and 44 elements. Since not all of the compare output lines 117 for the 16 data element compare, logic blocks of FIG. 6a are in the on-state, the total compare AND 190 is not satisfied. This condition is sensed over line 48 by the jump logic 32 which causes the reference pattern storage 38 to load the next reference pattern, number 1, into the reference pattern register 36 and increment the counter 40 by 1.

This sequence of events is repeated 14 times untril the reference pattern number 14 of FIG. 8b and FIG. 3 is loaded into the reference pattern register 36. Reference pattern number 14 will constitute the first identified component of the composite representation of the complex geometric data pattern shown in FIG. 8e. It is noted that all of the elements for reference pattern number 14 have a $C_b$ value equal to 1. The top two rows of elements in FIG. 8b satisfy the noncompare AND-INVERT gate 160-115 by virtue of there being no signal on input line 109 connected to the reference pattern element line 54 corresponding to the binary variable $D_r$. The bottom two rows of elements in FIG. 8d also satisfy their respective non-compare AND-INVERT gate 160-115 because of the following action of the logic block. $D_r$ is in the on-state and therefore, line 109 is a 1. $D_b$ the data element input line was originally on and set the DB flip flop 140 into its set state. This caused the set state output line 101 to turn on which, in combination with the on-state of $D_r$ reference pattern element input line 54, caused the new bit compare line AND 100 to turn on, thus conditioning on the new bit compare OR gate 180 by means of line 105. The new bit compare on-state is transmitted by line 119 to the total compare AND gate 190. The DB flip flop being in its on-state, its off-state output line 111 causes the non-compare AND-INVERT gate 160-115 to be in the on-state. Since all 16 output lines 117 are in their on-state indicating a total compare ($C_b$=1) and a new bit compare line 105 for at least one element of the 16 elements in the bit comparator is in its on-state (N=1), the total compare AND gate is satisfied and generates a total compare output signal on lines 48 and 107. The total compare output signal on line 107 in combination with the new bit compare signal N on line 105, conditions the A set AND gate 110 and the DB reset AND gate 120 thereby causing the reset of the DB flip flop and the setting of the A flip flop indicating that the data element was black and has been encoded. The total compare output signal on line 48 signals the jump logic 32 to condition the AND gate 42 and cause the gating of the number 14 as the value of alpha, from the pattern counter 40 to the output code register 46 thereby encoding reference pattern number 14. After reference pattern number 14 has been encoded with its index number 14 being loaded into positions 1 through 7 of the output code register 46, the jump logic 32 infers from the fact that there is no composite completion signal on line 50 from the bit comparator 28, that reference pattern number 14 does not completely represent the complex geometrical pattern of FIG. 8e. Therefore, the jump logic 32 loads zeros into the 8 and 9 positions in the jump code for the output code register 46. Jump logic 32 then causes the output code register 46 to output the encoded word representing reference pattern number 14 as the first of a sequence of component reference patterns comprising a composite representation of the data pattern of FIG. 8e.

Jump logic 32 now causes the reference pattern storage 38 to load subsequent reference patterns 15 through 23. Reference pattern 23, shown in FIG. 8c contains black elements at element locations 31, 32, 33, 41, 42, and 43. Reference pattern 23 is wholly contained within reference pattern 14 and, although it could be a bonefide component of a composite representation of the complex geometrical pattern of FIG. 8e, including reference pattern 23 in such a composite would reduce the efficiency of the data compaction scheme. The bit comparator 28 rejects reference pattern 23 because no new bit compare signal is generated by the new bit compare AND 100. As is seen from an examination of elements 31, 32, 33, 41, 42 and 43 the binary value of $A_n$ is equal to 1 and the binary value of $DB_n$ is equal to 0. Since the DB flip flop 140 in each data element compare logic block is in its off-state, line 101 does not have an on signal. Therefore, no new bit compare signal N can be generated on line 105 to the new bit compare OR gate 180. This prevents a new bit compare signal from being transmitted over line 119 to the total compare output AND gate 190. Thus, a total compare output signal on line 48 remains off, which informs the jump logic that a valid comparison for the purposes of generating a component of the composite, has not been made. Jump logic 32 therefore, continues the sequential loading of subsequent reference patterns from the reference pattern storage 38 into the reference pattern register 36.

Reference patterns drawn from the library of FIG. 3 are sequentially loaded into the reference pattern register 36 until reference pattern number 39 shown in FIG. 8d is loaded. Reference pattern number 39 constitutes a second bonafide component of the composite representation of the complex geometrical data pattern of FIG. 8e. It is noted that the DB flip flop is set in elements 14 and 24 and the A flip flop is set in elements 34 and 44. In elements 14 and 24, a new bit compare signal N is generated on line 105 to the new bit compare OR gate 180 conditioning the input line 119 to the total compare AND gate 190. The elements in the first three columns of the bottom two rows of reference pattern number 39 are blank for the reference pattern and have been encoded as will be recalled in the process of encoding reference pattern number 14. This is shown by the state of the binary variable $A_n$ which is equal to 1 in each case. In these elements the A flip flop 130 has its off-state output line 123 in a 0 state thereby causing the compare output line 117 to be in the on-state ($C_{b=1}$). The elements in the first three columns of the top two rows have a compare output on their respective lines 117 in the on-state by virtue of the no-signal condition on line 109 connected to the reference pattern element input 54. Thus, compare output signals for all 16 elements reside in their respective output lines 117 thereby conditioning the total compare output AND gate 190. Total compare output line 48 carrying the total compare signal causes jump logic 32 to activate AND gate 42 gating the index number 39 as the value of alpha, from the pattern counter 40 the positions 1 through 7 of the output code register 46. Because all of the DB flip flops 140 in the 16 data element compare logic blocks of the bit comparator 28 are now in their reset position, the composite completion AND gate 170 is satisfied and an output signal on line 50 indicates to jump logic 32 that the reference pattern number 39 which has been identified, is the last component necessary to fully represent the complex data pattern of FIG. 8e by a composite representation. Jump logic 32 therefore, causes the line buffer 24 to load the next data block into the data block register 26. The jump logic 32 having its 16 lines of data element inputs 27 connected to the block register 26, determines whether the next data block is all white. If the next data block is not all white, jump logic 32 loads a 0 in the 8 position and a 1 in the 9 position of the jump code in the output code register 46. This identifies the encoded word as a code pattern index number alpha which constitutes the last (and possibly only) component in a composite representation and instructs the decoder to advance one block after decoding the word. If the jump logic 32 determines that the next data block in the data block register 26 is all white, the jump logic 32 increments the white run counter 30 by 1 and waits for the second next data block to be loaded into the data block register 26. If the second next data block is not all white then jump logic 32 loads a 1 in position 8 and a 0 in position 9 of the jump code in the output code register 46. This identifies the encoded word as a code pattern index number alpha and instructs the decoder to advance two blocks after it has decoded the reference pattern. If the second next data block in a data block register is an all white data block then the jump logic loads the 0's into the positions 8 and 9 of the jump code and the output code register 46 which ideitifies the encoded word as a code pattern index number and instructs the decoder to remain in the present block. The white run counter will then count the number of successive all white data blocks which are loaded by the line buffer 24 into the data block register 26 and will run length encode that number when the next non-all-white data block is loaded into the data block register 26. This is accomplished by the jump logic determining that the first non-all white data block has been loaded into the data block register after a sequence of all white data blocks. The jump logic 32 causes the OR gate 44 to gate out the number stored in the white run counter 30 as the value delta, into positions 1 through 7 of the output code register 46. The jump logic 32 then loads ones in the 8 and 9 position of the jump code for the output code register 46. This identifies the encoded word as a run length encoded sequence of delta all white data blocks.

Detailed illustrations of the networks and hardware for the control 34 of the data decompressor of FIG. 5, are shown in FIGS. 9 and 10. For convenience, FIG. 5 shows control 34 representing logic associated with regulating and directing the flow of data through the data compressor. However some of this logic is distributed to other functional blocks in the data compressor in that it consists of those gates in each functional block which communicate and interact with control signals from other blocks. FIG. 9 shows the operation of the control function in more detail, showing most of the control logic gathered into one block, jump logic 32. An additional block, buffer control multiplexer 56, is shown in FIG. 9, and serves to perform the pingpong function for directing the read in-read out control to the appropriate line buffers 22 or 24.

FIG. 10 is a detailed illustration of the control hardware in the jump logic 32. This logic consists of three section. The first section of logic is that logic necessary to determine if a complete image has been encoded and consists of line group oscillator 300, gate 304, and line group counter 305. The second section of logic is that logic necessary to transfer image data into the appropriate line buffer 22 and consists of the image oscillator 301, the 1024 divider 302 and the four divider 303. And the third section of logic is that logic necessary to transfer data out of the appropriate line buffer 24 and to control the encoding of data blocks, and consists of the remainder of the logic shown in FIG. 10.

The first section of logic necessary to determine if a complete image has been encoded will now be described. The operation of the data compressor is initiated by a signal on the system start line 71. This signal resets the line group counter 305 from the 256 position which activates the gate 304. Gate 304 passes a pulse from the line group oscillator 300 which starts the image oscillator 301 and operates oscillator 310. Thus the line buffer load and unload logic commences to run at which time the respective stop signals 401 and 402 disappear. This occurs since the four divider 303 and the data block counter 309 start counting at this time. When data block counter 309 starts counting, this inhibits gate 304 from passing any more line group pulses until both the line buffer load and unload logic complete their respective cycles. At the completion of the cycles of the line load and unload buffers, the stop signals reappear and gate 304 passes another pulse. This pulse also increments the line group counter 305 which inhibits gate 304 by means of line 304 when the count 256 is reached. The achievement of the count 256 indicates that a complete image has been encoded and the logic awaits a new start signal over line 71 for a new image.

The logic necessary to transfer image data into the appropriate line buffer will now be described. The image iscillator 301 generates oscillator pulses over line 69-1 which clock individual image bits into the line buffer. The 1024 divider 302 then generates line select pulses over lines 69-2 for every 1024 bits generated on line 69-1. The line select pulses move the bit load point from raster line 1 to raster line 2 to load the four lines of the 4 by 1024 line buffer in sequence. The four divider 303 then determines when all four lines have been loaded and emits a stop signal over line 401 and the line buffer select lines 70. This stop signal halts the image oscillator 301 and informs the first logic section that the second logic section has completed its task. Line buffer select line 70 switches the buffer multiplexer control 56 of FIG. 9 on the condition that the third section of logic has completed its task. This conditional switching is accomplished by gating line buffer select line 70 with the stop signal 402 in the gate 324.

The third section of logic necessary to transfer data out of the appropriate line buffer and to control encoding of the data blocks will now be describes. The signal from gate 304 which starts the run oscillator 310 also inputs a bit through gate 307 into the shift register 308. The first stage of shift register 308 activates data block load 69-4 which transfers a data block from the line buffer (shown as a solid line from line buffer 24 in the illustration of FIG. 5) into the data block register 26 of FIG. 5. The first stage of the shift register 308 also activates the four counter 306 which generates four pulses on line buffer shift 69-3. This shifts a new data block into position in the line buffer 24 as shown in FIG. 9. The bit in shift register 308 shifts to the next position generating an initial reset pulse on line 53 which resets the appropriate portions of the data compressor prior to data block encoding. The bit in register 308 shifts again and generates a load pulse on line 58 to the comparator, which transfers the data block into the comparator. The bit in the register 308 shifts to the last position and generates a ready pulse on line 403 which serves to strobe the balance of the logic in the third section.

For those cases where the data block is not all white, the all white decode 325 will have a zero at its output 404. The inverter 311 converts this to a one on line 405 which, when combined with the ready pulse 403, generates a start signal at the output of the gate 316. This start signal starts the pattern counter clock pulses over line 52 from the pattern compare clock gate 312. This operation starts a comparison function on a data block which continues until a compare is found. When a compaare is found, the total compare line 48 is activated and generates a gate alpha signal on line 62. If the compare operation is not complete (that is a composite analysis complete signal is missing on line 50) the load zero-zero signal on line 60-1 is generated from the gate 319. If the compare is complete (that is the composite analysis complete signal on line 50 is on) the pattern compare clock 312 is halted and a load zero-one signal on line 60-2 or a load one-zero signal on line 60-3 is generated along with another gate alpha signal on line 62. This operation is accomplished by the composite analysis complete line 50 signaling for another data block by activating the shift register 308 through the gate 307. The new data block is decoded by all white decode 325. If it is not all white, the gate 320 is activated and a load zero-one signal on line 60-2 is generated by the ready line 403. If the new data block is all white, the gate 321 is activated and load one-zero signal is generated.

For the case where an all white data block is received, the flip flop 314 is set and the gate 317 requests another data block through gate 307. If the next data block is also all white, gate 323 outputs a count all white signal on line 57 to increment the white run counter 30. This operation continues until the next data block is not all white, at which time gate 322 is activated and gate 323 is turned OFF. Gate 322 is activated by the flip flops 314 and 315 in the event the new data block is not all white. Flip flops 314 and 315 indicate that at least two consecutive data blocks were all white prior to the present data block which is not all white. The result of this operation is that a load one-one signal is generated on line 60-4 and a gate delta signal is generated on line 68 to cause the new non-white data block to be analyzed by the compare logic.

The data block counter 309 counts the data blocks as they are analysed and encoded. When 256 data blocks have been counted, the run oscillator 310 is stopped and the first section logic is informed that the third section logic has completed its task.

There follows a description of the control network and hardware for the data decompressor of FIG. 7. A detailed illustration of the control line network associated with the control 208 of the data decompressor is shown in FIG. 11. The block entitled buffer control multiplexer 216 is also shown, which serves to route the read in-read out controls to the appropriate line buffer 212 or 214, in ping-pong fashion under the control of the line buffer select line 237. The structure of the control 208 is shown in FIG. 12 and consists of two logic sections (*a*) and (*b*). The (*a*) logic section controls the read out of the line buffers 212 or 214 and consists of the image oscillator 500, the 1024 divider 501, and the four divider 502. The (*b*) section logic controls the loading of the line buffers in accordance with commands from the mode detector 202 and the white run indexer 206.

A detailed description of the operation of the hardware for the (*a*) section logic will now be made. The image oscillator 500 generates the image clock pulse over line 218-2, which serves to strobe out bits at the video rate on line 13 of FIG. 11. The 1024 divider 501 counts out one line of image bits and then selects for read out, the next line of the line buffer. This operation continues until all four lines of the 4 by 1024 buffer are read out, as detected by the four divider 502. The four divider 502 then selects the other line buffer for read out and sets up the original line buffer for read in. The line buffer select 237 accomplishes this operation through the buffer select line 237 also initiates the operation of the (*b*) logic section.

The operation of the (*b*) logic section for the control 208 of the data decompressor will now be described. The line buffer select line 237 turns ON the run clock 503 at the beginning of each 4 lines sequence of data bits. The output line 601 of the run clock 503 strobes the gate 504 and generates a code word transfer pulse over line 238. This code word transfer pulse is directed to the input register 200, the image buffer 212, and serves to initiate the transfer of the first code word. if the first code word indicates a pattern (that is no signal on the advance line 242), the mode detector 202 of FIG. 11 sets the pattern request line 241 so as to signal the reference pattern library 204 to initiate transferring reference patterns over line 230 to the reconstructed data block register 210. At the same time, another code word tranfer pulse on line 238 of FIG. 12 is generated from the gate 504. This second transfer pulse initiates the transfer of another code word. If the second code word indicates the pattern (that is a one signal is present on line 242), the pattern is generated and the advance one line 239 of FIG. 11 inputs a signal to the control 208. This input signal causes the data block transfer line 218-1 to generate a signal from the gate 505. The signal on the data block transfer line 218-1 causes the assembled data block to transfer from the reconstructed data block register 210 to the selected line buffer 212 or 214. In addition, the completion counter 509 is incremented by one. Simultaneously, the code word transfer signal on line 238 is generated which initiates the input of the next code word. For illustration, it can be assumed that this next code word is a pattern and that a signal exists on the advanced two line 240. In this situation, a pattern is generated and the advanced two line 240 inputs a signal to the control 208. This input signal generates a data block transfer signal on the line 218-1 through the gates 506 and 505 and simultaneously inhibits the generation of a code word transfer pulse through gate 507 and inverter 510. In addition, the flip-flop 508 is set on the next clock pulse and causes a second data block transfer pulse to be generated on line 218-1. This would indicate an all white data block transfer because the previous transfer would clear the reconstructed data block register 210. The setting of the flip-flop 508 disables the gate 507 thereby activating gate 504 and generating a code word transfer pulse on line 238 which brings in the next code word. Assuming for this illustration that the next code word is an advance delta word such that the mode detector 202 raises the advanced delta line 228 to the white run indexer 206. In this situation the delta information on lines 224 are gated into the white run indexer 206 from the register 200. The white run indexer 206 then causes the advance line 242 to input a signal to the control 208. This input signal inhibits the gate 504 through the inverter 511, thereby preventing a code word transfer pulse from being generated on line 239. The advance signal on line 242 however does generate data block transfer pulse on line 218-1 through the gates 506 and 505. The data block transfer pulse gates the all white data block into the line buffer and also increments the white run indexer 206. The advance line 242 remains active until the white run indexer indexes the delta value to zero at which time the control renews the generation of data block transfers. When the white run indexer 206 reaches zero, the advance line 242 drops its signal and the data block transfers stop. In addition, gate 504 becomes enabled which again results in the generation of another code word transfer pulse on line 238.

This operation continues until the completion counter 509 which has been counting all data block transfers, indicates that the line buffer has been filled (in the case illustrated, with 256 data blocks). The run clock 503 stops at this juncture and subsequent control activity does not recommence until the other line buffer finished the video read out. At that time another line buffer select pulse is generated on line 237 and the entire process of data decompression is repeated.

The present invention permits a significant reduction in the number of simple geometric patterns which must be stored in the pictorial data transmission system for accomplishing the desired reduction in the time-bandwidth product of the transmission system and enhances compaction of pictorial data which is to be stored and displayed.

While the invention has been particularly shown and described with reference to the preferred embodiments thereof, it will be understood by those skilled in the art that the foregoing and other changes in form and detail may be made therein without departing from the spirit and scope of the invention.

I claim:

1. An apparatus for encoding a two dimensional fixed image in a data image transmission system, where the image is subdivided into a plurality of individual elemental areas forming a matrix of elements each having attributed thereto a binary value for black or white contents therein and said elements being allocated into adjacent data blocks of $n$ by $m$ elements, comprising:
   a data block register connected to an input line for receiving an n by m element data block;
   an $n$ by $m$ bit comparator having an input connected to the output of said data block register;
   a reference pattern register having an output connected to the input of said bit comparator;
   a reference pattern storage having an output connected to the input of said reference pattern register, for storing a plurality of simple geometric block patterns which are sequentially loaded by the pattern storage into the reference pattern generator in the order of greatest to least black element population;
   said bit comparator comparing each reference pattern loaded into said reference pattern register to determine a match of all populated elements in the reference pattern to black elements which appear in the data block registers;
   encoding means having an input connected to said bit compare means and said pattern storage for encoding an index number associated with a reference pattern which is matched by means of said bit comparator;
   said encoding means connected to an output line for outputting said encoded reference pattern to a utilization means;
   said encoding means supplying an indication in said output word that the present data block is completely encoded if there are no further population elements in the data block which are left unmatched with the first reference pattern;
   said bit comparator storing the location of each encoded element for said first reference pattern if further population elements in the data block are left unmatched with the first reference pattern and said encoding means supplying an indication in said encoded output word that a next encoded reference pattern will follow which is to be combined with the first reference pattern in a composite shape upon decoding;
   whereby each data block in the pictorial image is encoded as a composite of simple geometric block patterns.

2. An $n$ by $m$ bit pictorial data image comparator, for comparing a complex arrangement of black elements in an $n$ by $m$ element pictorial data image, with simple arrangements of black elements in each of a sequence of $n$ by $m$ element simple reference patterns and identifying a combination of such reference patterns which will form the components of a composite representation of the pictorial data image, comprising:
   an $n$ by $m$ array of data element compare logic blocks, each of which has a data input connected to one of $n$ by $m$ data element input lines for accepting a data element of which said pictorial data image is composed and each of which has a reference input connected to one of $n$ by $m$ reference pattern element input lines for accepting a reference pattern element of which one of a sequence of reference pattern is composed;
   a bit compare OR gate having $n$ by $m$ input lines, each connected to a new bit compare output of a separate one of said data element compare logic blocks, for gating an output new bit compare signal on a new bit compare line when an input new bit compare signal has been received over one of said new bit compare input lines indicating a black element of one of said simple reference patterns, is found to compare with a black element of said pictorial data image which has not been previously found to compare, for a component simple reference pattern having no black elements which do not compare with black elements in said pictorial data image;
   the total compare AND gate having $(n \times m)+1$ input lines, one of the lines being the new bit compare line from the output of said new bit compare OR gate, and each of said other $n$ by $m$ lines being connected to a compare output of a separate one of said data element compare logic blocks for gating a total compare signal on a total compare output line to a utilization device, when a component reference pattern is found having no black elements which do not compare with black elements in said pictorial data image;
   said total compare output line from said total compare AND gate being connected to the total compare input of each of said $n$ by $m$ data element compare logic blocks, to cause the storage of an indicium in each of said logic blocks wherein a new bit compare signal is transferred to said new bit compare OR gate;
   a composite completion AND gate having $n$ by $m$ input lines, each connected to a completion output of a separate one of said data element compare logic blocks, for gating a composite completion signal on an output line to a utilization device when no further black elements in said pictorial data image remain unmatched to black elements in the component reference patterns identified;
   each data element compare logic block comprising:

a first flip flop with its set line as said data input connected to one of said $n$ by $m$ data element input lines, for storing an indicium that the data element is black and having its off-state output as said completion output connected to the input of said composite completion AND gate;

a new bit compare AND gate with a first input line as said reference input connected to one of said $n$ by $m$ reference pattern element input lines and a second input line connected to the on-state output of said first flip flop and with its output as said new bit compare output connected to the input of said new bit compare OR gate;

a non-compare AND-INVERT gate having a first input line connected to said reference pattern input line and a second input line connected to the off-state output of said first flip flop and with its output as said compare output connected to the input of said total compare AND gate;

a reset AND gate having a first input line connected to the output of said new bit compare AND gate and a second input line as said total compare input connected to the output of said total compare AND gate;

a set AND gate having a first input line connected to the output of said new bit compare AND gate and a second input line as said total compare input connected to the output of said total compare AND gate;

a second flip flop with its set line connected to the output of said set AND gate and its off-state output connected as a third input to said non-compare AND-INVERT gate, for storing an indicium that the data element is black and has been compared with a corresponding black element in a component reference pattern having no black elements which do not compare with the black element in said pictorial data image;

whereby the component simple reference patterns of a composite representation of a complex pictorial data image, may be identified.

3. A method for encoding a two dimensional fixed image in a data image transmission system, where the image is subdivided into a plurality of individual elemental areas forming a matrix of elements such having attributed thereto a binary value for black or white contents therein and said elements being allocated into adjacent data blocks of $n$ by $m$ elements, comprising:

loading the $n$ by $m$ elements of a data block into a first register connected with a comparison means;

loading a simple reference pattern of $n$ by $m$ elements into a second register connected to said comparison means;

comparing each data element in the $n$ by $m$ data block stored in said first register with the corresponding data element in the $n$ by $m$ simple reference pattern stored in said second register;

storing the location of each element of said $n$ by $m$ simple reference pattern if each element therein compares with a corresponding element in the data block, and assembling an output word identifying the reference pattern so compared;

comparing all the data elements of the data block with all the corresponding elements of the reference pattern and said stored locations of successfully compared data elements;

assembling said output word so as to include a first block spacing designation indicating that the composite representation is complete, where all elements of the data block compare with all the combined elements of the referenced pattern and the stored locations of successfully compared data elements or a second spacing designation indicating that the composite representation is not complete, where not all elements of the data block compare with all the combined elements of the reference pattern and the stored locations of successfully compared data elements;

repeating the steps of loading for a next reference pattern and of comparing each element thereof and of conditionally storing, and of comparing all combined elements thereof, and of assembling, until all elements of the data block compare with all corresponding combined elements of the reference pattern and the stored locations of successful comparisons, so that the composite representation of the data block is complete;

repeating the step of loading for a next data block and the subsequent steps of loading reference patterns, comparing, storing, comparing and assembling, until all information bearing data blocks in said two dimensional fixed image have been represented as a composite of simple geometric reference patterns.

4. An $n$ by $m$ bit pictorial data image comparator, for comparing a complex arrangement of black elements in an $n$ by $m$ element pictorial data image, with simple arrangements of black elements in each of a sequence of $n$ by $m$ element simple reference patterns and identifying a combination of such reference patterns which will form the components of a composite representation of the pictorial data image, comprising:

an $n$ by $m$ array of data element compare logic blocks, each of which has a data input connected to one of $n$ by $m$ data element input lines for accepting a data element of which said pictorial data image is composed and each of which has a reference input connected to one of $n$ by $m$ reference pattern element of which one of a sequence of reference patterns is composed;

a bit compare OR gate having $n$ by $m$ input lines, each connected to a new bit compare output of a separate one of said data element compare logic blocks, for gating an output new bit compare signal on a new bit compare line when an input new bit compare signal has been received over one of said new bit compare input lines indicating a black element of one of said simple reference patterns, is found to compare with a black element of said pictorial data image which has not been previously found to compare, for a component simple reference pattern having no black elements which do not compare with black elements in said pictorial data image;

the total compare AND gate having $n$ by $m$ +1 input lines, one of the lines being the new bit compare line from the output of said new bit compare OR gate, and each of said other $n$ by $m$ lines being connected to a compare output of a separate one of said data element compare logic blocks for gating a total compare signal on a total compare output line to a utilization device, when a component reference pattern is found having no black elements which do not compare with black elements in said pictorial data image;

said total compare output line from said total compare AND gate being connected to the total compare input of each of said *n* by *m* data element compare logic blocks, to cause the storage of an indicium in each of said logic new bit compare OR gate;

a composite completion AND gate having *n* by *m* input lines, each connected to a completion output of a separate one of said data element compare logic blocks, for gating a composite completion signal on an output line to a utilization device, when no further black elements in said pictorial data image remain unmatched to black elements in the component reference patterns identified;

whereby the component simple reference patterns of a composite representation of a complex pictorial data image, may be identified.

* * * * *